United States Patent
Halmos

(10) Patent No.: US 9,726,761 B2
(45) Date of Patent: Aug. 8, 2017

(54) TARGET ROTATION DETERMINATION BY DIFFERENTIAL DOPPLER EVALUATION

(71) Applicant: Raytheon Company, Waltham, MA (US)

(72) Inventor: Maurice J. Halmos, Encino, CA (US)

(73) Assignee: Raytheon Company, Waltham, MA (US)

( * ) Notice: Subject to any disclaimer, the term of this patent is extended or adjusted under 35 U.S.C. 154(b) by 468 days.

(21) Appl. No.: 14/450,888

(22) Filed: Aug. 4, 2014

(65) Prior Publication Data

US 2016/0033645 A1 Feb. 4, 2016

(51) Int. Cl.
*G01S 17/58* (2006.01)
*G01S 7/48* (2006.01)
*G01S 17/50* (2006.01)

(52) U.S. Cl.
CPC ............ *G01S 17/58* (2013.01); *G01S 7/4802* (2013.01); *G01S 7/4808* (2013.01); *G01S 17/50* (2013.01)

(58) Field of Classification Search
CPC ........... G01S 17/50; G01H 9/00; G01N 21/41
See application file for complete search history.

(56) References Cited

U.S. PATENT DOCUMENTS

| 7,342,651 B1 * | 3/2008 | Woolfson | G01S 7/484 356/28 |
| 2003/0137645 A1 | 7/2003 | Fluckiger | |
| 2006/0038977 A1 | 2/2006 | Williams et al. | |
| 2010/0101327 A1 * | 4/2010 | Fluckiger | G01S 17/50 73/657 |

OTHER PUBLICATIONS

Mamidipudi et al.; "Multi-aperture Coherent Doppler Lidar for Mitigation of Turbulence and Vibration Induced Speckle Effects"; Conference on Lasers and Electro-Optics; 2002.
Extended European Search Report mailed on Nov. 26, 2015 in corresponding European Application No. 15170585.2, filed Jun. 3, 2015.

* cited by examiner

*Primary Examiner* — Luke Ratcliffe
(74) *Attorney, Agent, or Firm* — Burns & Levinson LLP; Joseph M. Maraia

(57) ABSTRACT

Systems and corresponding methods for use in measuring rotation characteristics (e.g., rotation magnitude and direction) of remote targets are provided. A laser light of a known frequency is incident upon the target and reflected. A portion of the reflected laser light is directed to detector field of view, where it is measured and analyzed. The detector field of view is divided into multiple segments, each capable of independently measuring the intensity and frequency of laser light incident thereon. The rotation magnitude of the target may be correlated with the width of the total Doppler spread of reflected light incident upon the detector. The rotation direction of the target may be correlated to a difference in the Doppler spreads measured for corresponding halves of the detector.

15 Claims, 15 Drawing Sheets

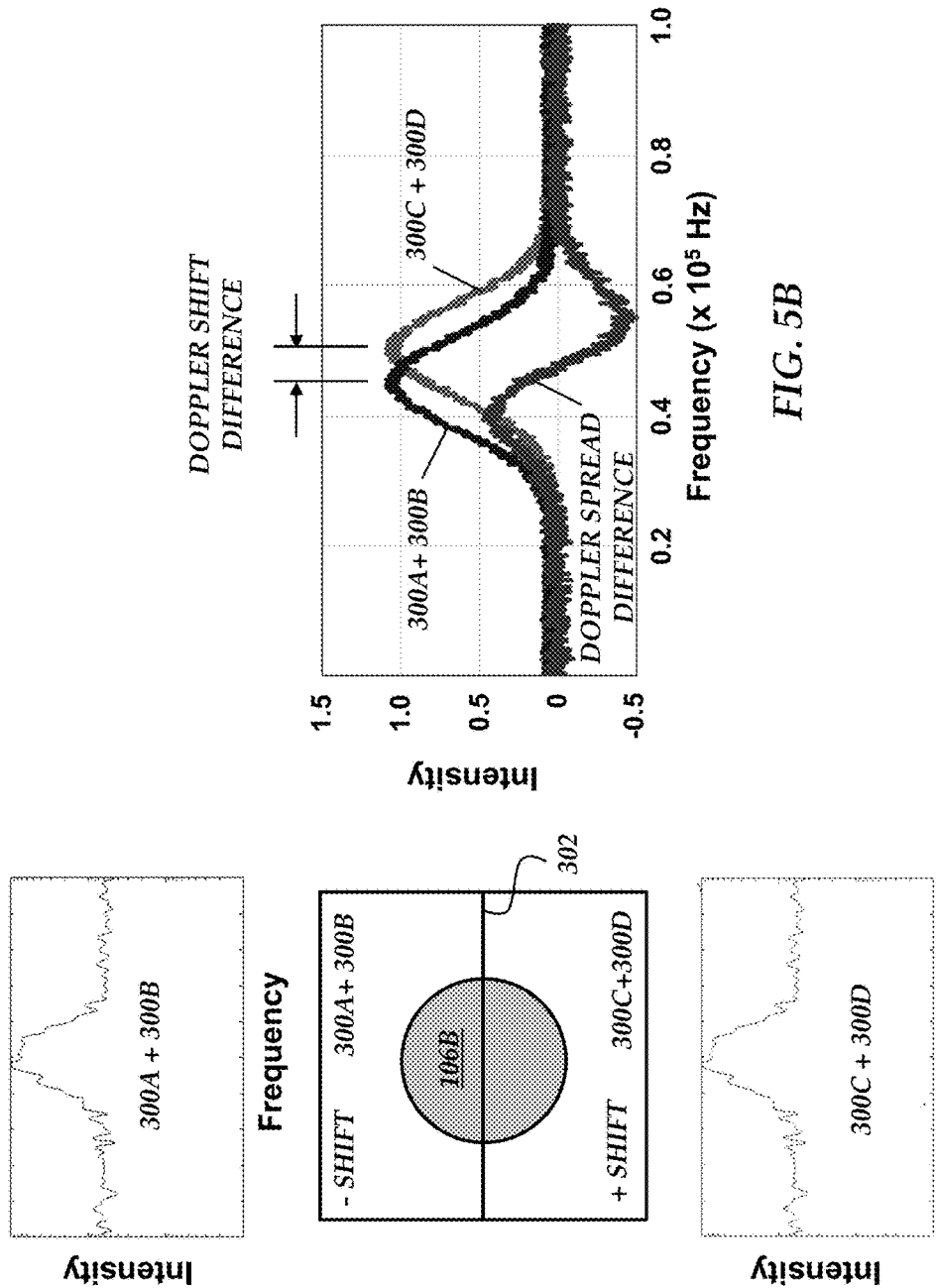

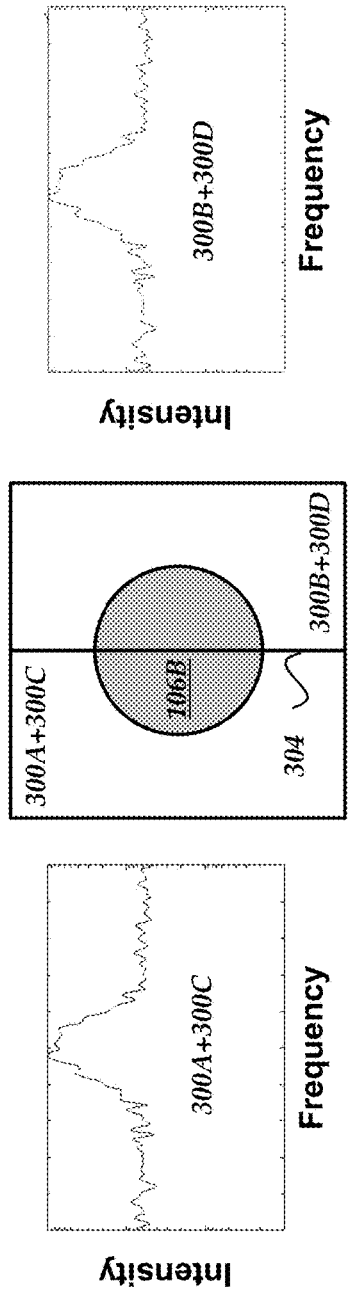
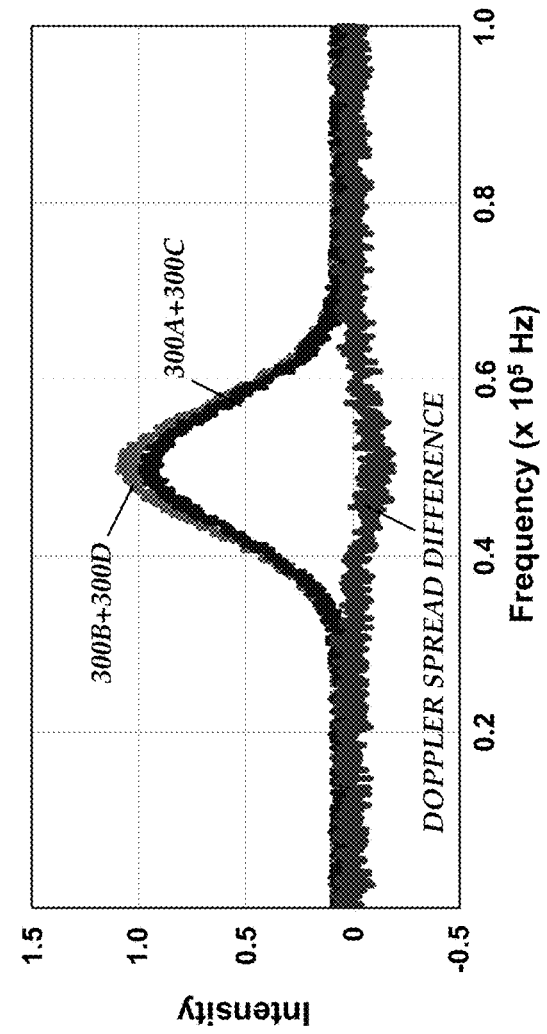
FIG. 6A
FIG. 6B

TARGET ROTATION DETERMINATION BY DIFFERENTIAL DOPPLER EVALUATION

BACKGROUND

Long range target identification plays an important role in defense and space awareness. Any information that may be obtained from a remote target can be potentially used to establish specific features of the target and/or classify the target. An example of such information is the rotation characteristics of the target, including whether the target is rotating, the magnitude of that rotation, and the axis of that rotation. For example, a target in flight may be observed to exhibit rotation if spinning about an axis and/or experiencing a change in flight direction. This rotation information alone may be sufficient to determine specific features of the target. Alternatively, this rotation information can be used in combination with other, more sophisticated, imaging approaches (e.g., inverse synthetic aperture and tomography) to determine specific features of the target.

While radar has been employed for measurement of target rotation characteristics, radar sensing does not perform well with dynamic targets that rotate relatively slowly. For example, a radar requires about 10 minutes to resolve the rotation characteristics of a target exhibiting an angular velocity of 1 mrad/sec. Such a timeframe may be unacceptably long for certain applications of interest (e.g., target identification).

Accordingly, there exists a need for improved techniques for measurement of a target's rotation characteristics at longer ranges.

SUMMARY

In an embodiment, a method of remotely measuring rotation of a target is provided. The method includes measuring, at a detector having a field of view divided into at least four spatially distinct light sensing segments, coherent light reflected from a target incident upon the detector field of view; outputting, by the detector, a plurality of signals to one or more processors, each signal representing a Doppler spread of the reflected light received at a respective detector segment. The method further includes determining, by the one or more processors: a first Doppler spread for reflected light received at a first half of the detector, the first Doppler spread including a first Doppler shift; a second Doppler spread for reflected light received at second half of the detector corresponding to the first half, the second Doppler spread including a second Doppler shift, where the first and second halves of the detector are separated along a first detector axis of division; and a first Doppler shift difference between the first and second Doppler shifts The method further includes determining, by the one or more processors: a third Doppler spread for reflected light received at a third half of the detector, the third Doppler spread including a third Doppler shift; and a fourth Doppler spread for reflected light received at a fourth half of the detector corresponding to the third half, the fourth Doppler spread including a fourth Doppler shift; and a second Doppler shift difference between the third and fourth Doppler shifts; where the third and fourth halves of the detector are separated along a second detector axis of division orthogonal to the first detector axis of division. The method also includes identifying, by the one or more processors, a rotation axis of the target, the rotation axis aligned with a vector given by the sum of: a first vector aligned with the first detector axis of division and having a magnitude given by the first Doppler shift difference; and a second vector aligned with the second detector axis of division and having a magnitude given by the second Doppler shift difference.

Embodiments of the method may include one or more of the following, in any combination.

In an embodiment of the method, measuring coherent light reflected from the target includes heterodyne detection of the coherent light reflected from the target incident upon the detector field of view.

In an embodiment of the method, determining the Doppler spread for reflected light received at each of said first, second, third, and fourth detector halves includes, by the one or more processors, coherently adding the Doppler spreads measured by at least two different detector segments forming said first, second, third, or fourth detector half, respectively.

In an embodiment of the method, the first detector half includes a first and a second detector segment; the second detector half includes a third and a fourth detector segment; the third detector half includes the first and the third detector segment; and the fourth detector halve includes the second and the fourth detector segments.

In an embodiment, the method further includes, by the one or more processors: identifying a width, $\Delta f$, of the Doppler spread of the reflected light received over the entire field of view of the detector; and calculating the magnitude of the target rotation according to: $\Delta f = 2D\Omega/\lambda$, where D is the diameter of the target, $\Omega$ is the magnitude of the target rotation, and $\lambda$ is the wavelength of the incident light.

In an embodiment of the method, determining the Doppler spread for reflected light received over the entire field of view of the detector includes, by the one or more processors, coherently adding the Doppler spreads measured for each detector segment.

In an embodiment of the method identifying $\Delta f$ includes, by the one or more processors: identifying the peak of the Doppler spread in the frequency domain; and measuring the full width of the Doppler spread at half the intensity from the peak; and identifying $\Delta f$ as said measured full width of the Doppler spread.

In an embodiment, a system for measuring rotation of a target is provided. The system includes a detector including a field of view divided into at least four spatially distinct light sensing elements. The detector is adapted to: measure coherent light reflected from a target incident upon the detector field of view; and output a plurality of signals, each signal representing a Doppler spread of the reflected light received at a respective detector segment. The system further includes one or more processors in communication with the detector. The one or more processors are adapted to: receive the plurality of signals; determine a first Doppler spread for reflected light received at a first half of the detector, the first Doppler spread including a first Doppler shift; determine a second Doppler spread for reflected light received at second half of the detector corresponding to the first half, the second Doppler spread including a second Doppler shift, where the first and second detectors are divided by a first detector axis of division; determine a first Doppler shift difference between the first and second Doppler shifts; determine a third Doppler spread for reflected light received at a third half of the detector, the third Doppler spread including a third Doppler shift; and determine a fourth Doppler spread for reflected light received at a fourth half of the detector corresponding to the third half, the fourth Doppler spread including a fourth Doppler shift, where the third and fourth halves of the detector are separated along a second detector axis of division orthogonal to the first detector axis of division. The one or more processors are further adapted to: determine a second Doppler shift difference between the third and fourth Doppler shifts; and identify, a rotation axis of the target aligned with a vector given by the sum of: a first vector aligned with the first detector axis of division and having a magnitude given by the first Doppler shift difference; and a second vector aligned with the second detector axis of division and having a magnitude given by the second Doppler shift difference.

Embodiments of the system may include one or more of the following, in any combination.

In an embodiment, the system further includes a first light source adapted to emit a first coherent light beam having a first frequency; a plurality of optical focusing systems adapted to direct the first coherent light beam incident upon the target, and direct least a portion of the coherent light reflected from the target at reflected coherent light upon the detector field of view; and a second light source adapted to emit a second coherent light beam having a second frequency upon the detector field of view, the second frequency different than the first frequency; where the plurality of signals output by the detector are based upon interference of the reflected first coherent light beam and the second coherent light beam.

In an embodiment of the system, the one or more processors are further adapted to coherently add the Doppler spreads measured by at least two different detector segments forming each of said first, second, third, or fourth detector half to determine the Doppler spread for reflected light received at each of said first, second, third, and fourth detector halves, respectively.

In an embodiment of the system, the detector includes four spatially distinct light sensing segments arranged in quadrants, where the first half of the detector includes the first and second detector segments, where the second half of the detector includes the third and fourth detector segments, where the third half of the detector includes the first and third detector segments, and where the fourth half of the detector includes the second and fourth detector segments.

In an embodiment of the system, the one or more processors are further adapted to: identify a width, $\Delta f$, of the Doppler spread of the reflected light received over the entire field of view of the detector; and calculate the magnitude of the target rotation according to: $\Delta f = 2D\Omega/\lambda$, where D is the diameter of the target, $\Omega$ is the magnitude of the target rotation, and $\lambda$ is the wavelength of the incident light.

In an embodiment of the system, the one or more processors are further adapted to determine the Doppler spread for reflected light received over the entire field of view of the detector by coherently adding the Doppler spreads measured for each detector segment.

In an embodiment of the system, the one or more processors are further adapted to: identify the peak of the Doppler spread in the frequency domain; and measure the full width of the Doppler spread at half the intensity from the peak; and identify $\Delta f$ as said measured full width of the Doppler spread.

In an embodiment, a non-transitory computer-readable medium is provided. The computer-readable medium includes computer-readable program codes embedded thereon having instructions that, when executed by the one or more processors, cause the one or more processors to: receive a plurality of signals output from respective segments of a detector including at least four spatially distinct light sensing segments, each signal representing a Doppler spread of coherent light reflected from a target and received at the respective detector segment; determine a first Doppler spread for reflected light received at a first half of the detector, the first Doppler spread including a first Doppler shift; determine a second Doppler spread for reflected light received at second half of the detector corresponding to the first half, the second Doppler spread including a second Doppler shift, where the first and second detectors are divided by a first detector axis of division; determine a first Doppler shift difference between the first and second Doppler shifts; determine a third Doppler spread for reflected light received at a third half of the detector, the third Doppler spread including a third Doppler shift; and determine a fourth Doppler spread for reflected light received at a fourth half of the detector corresponding to the third half, the fourth Doppler spread including a fourth Doppler shift, where the third and fourth halves of the detector are separated along a second detector axis of division orthogonal to the first detector axis of division; determine a second Doppler shift difference between the third and fourth Doppler shifts; and identify, a rotation axis of the target aligned with a vector given by the sum of: a first vector aligned with the first detector axis of division and having a magnitude given by the first Doppler shift difference; and a second vector aligned with the second detector axis of division and having a magnitude given by the second Doppler shift difference.

Embodiments of the computer readable medium may include one or more of the following.

In an embodiment, the computer-readable medium further includes instructions that, when executed, cause the one or more processors to coherently add the Doppler spreads measured by at least two different detector segments forming each of said first, second, third, or fourth detector half to determine the Doppler spread for reflected light received at each of said first, second, third, and fourth detector halves, respectively.

In an embodiment, the computer-readable medium further includes instructions that, when executed, cause the one or more processors to: identify a width, $\Delta f$, of the Doppler spread of the reflected light received over the entire field of view of the detector; and calculate the magnitude of the target rotation according to: $\Delta f = 2D\Omega/\lambda$, where D is the diameter of the target, $\Omega$ is the magnitude of the target rotation, and $\lambda$ is the wavelength of the reflected light.

In an embodiment, the computer-readable medium further includes instructions that, when executed, cause the one or more processors to: coherently sum of the Doppler spreads measured for each detector segment as the Doppler spread of the reflected light received over the entire field of view of the detector; identify the peak of the Doppler spread in the frequency domain; and identify the width of the Doppler spread to be the full width of the Doppler spread at half the intensity from the peak.

In an embodiment, a method of remotely measuring rotation of a target is provided. The method includes: measuring, at receiver including a detector having a field of view divided into at least four spatially distinct light sensing segments, coherent light reflected from a target incident upon the detector field of view, the incident coherent light including a speckle pattern that moves over time with respect to the detector field of view; outputting, by the detector, a plurality of signals to one or more processors, each signal representing an intensity of the reflected light received at a respective detector segment as a function of time. The method further includes determining, by the one or more processors: a first intensity as a function of time for reflected light received at a first half of the detector; a second intensity as a function of time for reflected light received at a second half of the detector corresponding to the second half, the first and second halves of the detector separated along a first detector axis of division; a third intensity as a function of time for reflected light received at a third half of the detector; a fourth intensity as a function of time for reflected light received at a fourth half of the detector corresponding to the third half, the third and fourth halves of the detector separated along a second detector axis of division oriented orthogonal to the first detector axis of division. The method also includes measuring, by the one or more processors, a first time delay representing a time for the speckle pattern to move between the first and second detector halves; measuring, by the one or more processors, a second time delay representing a time for the speckle pattern to move between the third and fourth detector halves; calculating, by the one or more processors, a linear velocity of the target, V, as the sum of: a first vector aligned perpendicular to the first detector axis of division and having a magnitude given by the measured first time delay; and a second vector aligned perpendicular to the second detector axis of division and having a magnitude given by the measured second time delay.

Embodiments of the method further include one or more of the following, in any combination.

In an embodiment, the method further includes, by the one or more processors, calculating a rotational velocity of the target from the linear target velocity, V.

In an embodiment of the method, the coherent light reflected from a target is incident upon the detector field of view positioned at the pupil plane of the receiver.

In an embodiment of the method, measuring coherent light reflected from the target includes heterodyne detection of the coherent light reflected from the target incident upon the detector field of view.

In an embodiment of the method, determining the light intensity as a function of time for reflected light received at each of said first, second, third, and fourth detector halves includes, by the one or more processors, coherently adding the signals measured by at least two different detector segments forming said first, second, third, or fourth detector half, respectively.

In an embodiment of the method, the first detector half includes a first and a second detector segment; the second detector half includes a third and a fourth detector segment; the third detector half includes the first and the third detector segment; and the fourth detector halve includes the second and the fourth detector segments.

In an embodiment of the method, measuring the first and second time delays includes, by the one or more processors: calculating a first cross-correlation as a function of time between the first intensity and the second intensity; calculating a first cross-correlation as a function of time between the third intensity and the fourth intensity; determining the first time delay as the time that maximizes the first cross-correlation; and determining the second time delay as the time that maximizes the second cross-correlation.

In an embodiment, a system for measuring rotation of a target is provided. The system includes a detector including a field of view divided into at least four spatially distinct light sensing elements and one or more processors in communication with the detector. The detector is adapted to: measure coherent light reflected from a target incident upon the detector field of view, wherein the incident coherent light includes a speckle pattern that moves over time with respect to the detector field of view; and output a plurality of signals, each signal representing an intensity of the reflected light received at a respective detector segment as a function of time. The one or more processors are adapted to: receive the plurality of signals; determine a first intensity as a function of time for reflected light received at a first half of the detector; determine a second intensity as a function of time for reflected light received at a second half of the detector corresponding to the second half, the first and second halves of the detector separated along a first detector axis of division; determine a third intensity as a function of time for reflected light received at a third half of the detector; determine a fourth intensity as a function of time for reflected light received at a fourth half of the detector corresponding to the third half, the third and fourth halves of the detector separated along a second detector axis of division oriented orthogonal to the first detector axis of division; measure a first time delay representing a time for the speckle pattern to move between the first and second detector halves; measure a second time delay representing a time for the speckle pattern to move between the third and fourth detector halves; calculate a linear velocity of the target, V, as, as the sum of: a first vector aligned perpendicular to the first detector axis of division and having a magnitude given by the measured first time delay; and a second vector aligned perpendicular to the second detector axis of division and having a magnitude given by the measured second time delay.

Embodiments of the system further include one or more of the following, in any combination.

In an embodiment, the system further includes a first light source adapted to emit a first coherent light beam having a first frequency; a plurality of optical focusing systems adapted to direct the first coherent light beam incident upon the target, and direct least a portion of the coherent light reflected from the target at reflected coherent light upon the detector field of view; and a second light source adapted to emit a second coherent light beam having a second frequency upon the detector field of view, the second frequency different than the first frequency; where the plurality of signals output by the detector are based upon interference of the reflected first coherent light beam and the second coherent light beam.

In an embodiment of the system, the one or more processors are further adapted to coherently add the signals measured by at least two different detector segments forming each of said first, second, third, or fourth detector half to determine the intensity as a function of time for reflected light received at each of said first, second, third, and fourth detector halves, respectively.

In an embodiment of the system, the first detector half includes a first and a second detector segment; the second detector half includes a third and a fourth detector segment; the third detector half includes the first and the third detector segment; and the fourth detector halve includes the second and the fourth detector segments.

In an embodiment of the system, the one or more processors are further adapted to calculate a rotational velocity of the target from the linear target velocity, V.

In an embodiment of the system, the detector field of view is positioned at the pupil plane of the receiver.

In an embodiment of the system, measuring the first and second time delays includes, by the one or more processors: calculating a first cross-correlation as a function of time between the first intensity and the second intensity; calculating a first cross-correlation as a function of time between the third intensity and the fourth intensity; determining the first time delay as the time that maximizes the first cross-correlation; and determining the second time delay as the time that maximizes the second cross-correlation.

In an embodiment, a non-transitory computer-readable medium having computer-readable program codes embedded thereon is provided. The program codes embedded thereon include instructions that, when executed by the one or more processors, cause the one or more processors to: receive a plurality of signals output from respective segments of a detector including at least four spatially distinct light sensing segments, each signal representing an intensity of coherent light reflected from a target and received at the respective detector segment as a function of time, wherein the received light includes a speckle pattern that moves over time with respect to the detector field of view; determine a first intensity as a function of time for reflected light received at a first half of the detector; determine a second intensity as a function of time for reflected light received at a second half of the detector corresponding to the second half, the first and second halves of the detector separated along a first detector axis of division; determine a third intensity as a function of time for reflected light received at a third half of the detector; determine a fourth intensity as a function of time for reflected light received at a fourth half of the detector corresponding to the third half, the third and fourth halves of the detector separated along a second detector axis of division oriented orthogonal to the first detector axis of division; measure a first time delay representing a time for the speckle pattern to move between the first and second detector halves; measure a second time delay representing a time for the speckle pattern to move between the third and fourth detector halves; calculate a linear velocity of the target, V, as, as the sum of: a first vector aligned perpendicular to the first detector axis of division and having a magnitude given by the measured first time delay; and a second vector aligned perpendicular to the second detector axis of division and having a magnitude given by the measured second time delay.

Embodiments of the computer-readable medium further include one or more of the following, in any combination.

In an embodiment, the computer-readable medium further includes instructions that, when executed, cause the one or more processors to coherently add the signals measured by at least two different detector segments forming each of said first, second, third, or fourth detector half to determine the intensity of light reflected from the target and received at each of said first, second, third, and fourth detector halves, respectively, as a function of time.

In an embodiment, the computer-readable medium further includes instructions that, when executed, cause the one or more processors to calculate a rotational velocity of the target from the linear target velocity, V.

In an embodiment, the computer-readable medium further includes instructions that, when executed, cause the one or more processors to: calculate a first cross-correlation as a function of time between the first intensity and the second intensity; calculate a first cross-correlation as a function of time between the third intensity and the fourth intensity; determine the first time delay as the time that maximizes the first cross-correlation; and determine the second time delay as the time that maximizes the second cross-correlation.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

FIGS. 5A-5B illustrate return signal measurement for corresponding first and second halves of the detector of FIG. 3 separated by a first detector axis (e.g., an elevation axis) according to embodiments of the disclosure; (A) return signal measurements of first and second detector halves individually; (B) Doppler spread difference between the return signal measurements of the first and second detector halves;

FIGS. 6A-6B illustrate return signal measurement for corresponding third and fourth halves of the detector of FIG. 3 separated by a second detector axis (e.g., an azimuth axis) according to embodiments of the disclosure; (A) return signal measurements of third and fourth detector halves individually; (B) Doppler spread difference between the return signal measurements of the third and fourth detector halves;

DETAILED DESCRIPTION

Figure 1A:
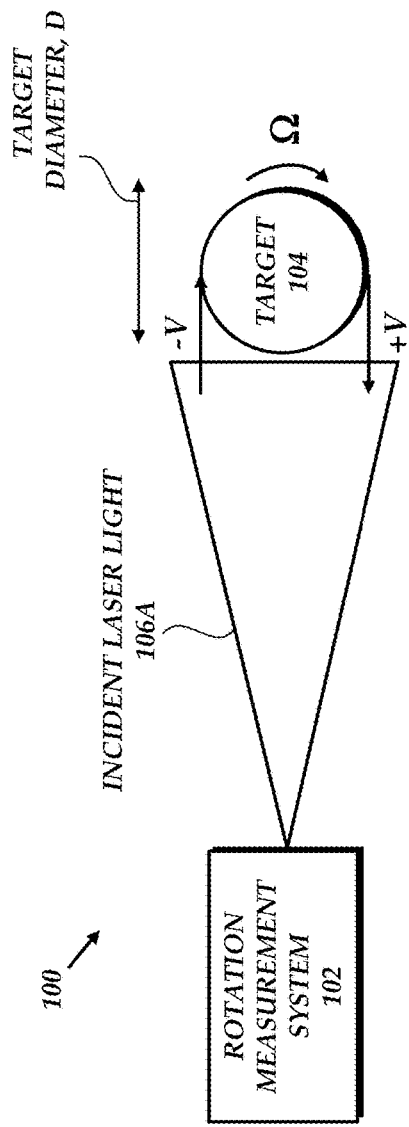
FIGS. 1A-1B are schematic illustrations of an embodiment of a rotation measurement system for use in detecting a rotation magnitude and direction of a target based upon laser light reflected from the target ("return signal"); (A) laser light incident upon a target; (B) laser light reflected from the target ("return signal")

Embodiments of the disclosure are directed to systems and corresponding methods for measuring rotation characteristics (e.g., rotation magnitude and direction) of remote targets. The system includes a receiver housing, including optics, that direct coherent light (e.g., laser light) reflected from a target object onto the field of view of a detector. The detector measures the intensity and frequency of the reflected coherent light (referred to herein interchangeably as a return signal) and outputs a plurality of signals representative of the measured reflected light to an analyzer. The analyzer employs the measured intensity-time and frequency-time response of the reflected laser light to determine rotation characteristics of the target. As discussed in greater detail below, in embodiments of a first detection technique, the return signal is measured at the image plane of the receiver optics, while in embodiments of a second detection technique, the return signal is measured at a pupil plane of the receiver optics. Measuring the return signal at these different locations allows the effects of the target rotation on the return signal to be analyzed in different ways, providing alternative approaches to measurement of target rotation characteristics.

Use of laser light for determining rotation characteristics of a target provides a number of advantages over radar. For example, laser light propagates with much less divergence than radar, allowing laser light to reach targets at much larger ranges than radar. Furthermore, laser light is much more sensitive to low rotation speeds than radar. For example, a target object rotating at 1 mrad/sec would require about 10 minutes to be resolved by radar but can be resolved in about 5 ms using laser light. Additionally, laser light may be used to characterize target rotations as low as about 0.1 mrad/sec.

In embodiments of the first detection technique, changes in the frequency of return signals are measured by the detector at the image plane of the receiver to determine the direction and magnitude of target rotation. In general, light reflected from a rotating object will experience a change in frequency, referred to as a Doppler shift. The direction and magnitude of the Doppler shift depend upon the rotation characteristics of the target at the point of reflection. For example, light reflected from portions of the target moving away from the detector will decrease in frequency as compared to the incident frequency (i.e., a negative or red shift), while laser light reflected from portions of the object moving towards the detector will increase in frequency (i.e., a positive or blue shift). The magnitude of the Doppler shift is proportional to the radial component of the target's surface velocity at the point of reflection, increasing from zero at the rotation axis of the target to a maximum at the extreme edges of the target.

The return signal measured by the detector is representative of light reflected from various locations on the target surface, each exhibiting a different Doppler shift of different magnitude. As a result, when plotting the return signal in the form of intensity as a function of frequency, Doppler shifts are observed over a range of frequencies. In this context, the intensity distribution may be referred to as a Doppler spread, while the frequency at the peak of the Doppler spread may be referred to as its Doppler shift.

Embodiments of the detector are configured to take advantage of the spatial variation in the Doppler spread to detect the rotation magnitude and direction of targets. The detector field of view is divided into multiple segments, each capable of independently measuring the intensity and frequency of the return signal incident thereon. For example, the detector segments may output electrical currents representative of the intensity and frequency of the reflected light. By analyzing the return signals measured at different detector segments, target rotation and direction may be determined.

For example, assume a detector with four segments, arranged in equal sized quadrants. A first detector half (e.g., a top half) may be formed by first and second detector segments, while a corresponding second detector half (e.g., a bottom half) may be formed by third and fourth detector segments. Likewise, a third detector half (e.g., a left half) may be formed by the first and third detector segments while corresponding fourth detector half (e.g., a right half) may be formed by the second and fourth detector segments. So configured, the first and second halves are separated by a first detector axis of division, while the third and fourth halves are separated by a second detector axis of division.

According to this first embodiment, the rotation magnitude of the target may be correlated with the width of the Doppler spread measured for reflected light incident upon the entire field of view of the detector. This Doppler spread may be calculated by combining the Doppler spreads measured by all segments of the detector. Continuing the example above, the Doppler spread for the entire detector field of view is given by the combination of the Doppler spreads measured at each of the four detector segments.

Embodiments of the first detection technique further determine the target rotation direction from differences in Doppler shifts measured between corresponding halves of the detector. In general, the presence of such a Doppler shift difference indicates that the return signal measured for one half of the detector is decreased or increased with respect to the corresponding detector half. The physical implication of this observation is that at least a portion of the target rotation takes place away from the detector half measuring a negative Doppler shift and towards the corresponding half measuring a positive Doppler shift. As target's rotation axis marks the transition between rotation towards or away from the detector, this observation can be alternatively understood as indicating that at least a portion of the target's rotation takes place about a virtual axis aligned with the detector axis of division separating the corresponding detector halves. The orientation of the target's rotation axis can thought of as the sum of two orthogonal vectors, each having a magnitude and direction, where the direction of each vector is aligned with the detector axes, and the sign of each vector is given according to a sign convention adopted for the analysis (e.g., a right handed rule).

To determine these two orthogonal vectors in the context of the detector having four segments, assume that the top and bottom detector halves are each formed from two segments and separated by a detector axis of division aligned with the elevation axis. Further assume the left and right segments are likewise formed by two detector halves and separated by a detector axis of division aligned with the azimuth axis. Taking the two orthogonal vectors to be aligned with the azimuth and elevation axes, the magnitude of the Doppler shift difference between the top and bottom detector segments gives the magnitude of the elevation vector and the magnitude of the Doppler shift difference between top and bottom of the detector gives the magnitude of the azimuth vector. Following a right handed rule convention, rotation towards the bottom and right detector halves is associated with the positive directions of the elevation and azimuth vectors, respectively, while rotation towards top and left detector halves is associated with negative directions of the elevation and azimuth vectors, respectively.

In embodiments of the second detection technique, changes in the intensity of return signals as a function of time are measured by the detector at the pupil plane of the receiver, rather than the image plane. In general, light is diffusely reflected from the target and exhibits random intensity changes as a function of time (e.g., a speckle pattern). Due to the rotation of the target, when the speckle pattern is projected onto a plane, it appears to move at a linear velocity that is related to the direction and magnitude of the target's rotation. Thus, by placing the detector in the pupil plane of the receiver, where the receiver aperture is re-imaged on the detector field of view, the motion of the speckle pattern may be measured by the detector. Further analysis of the measured speckle pattern motion may be employed to determine its velocity, and thus the target's rotation.

For example, the detector employed in this second embodiment may be the same as that discussed above with respect to the first embodiment, including a plurality of spatially distinct detector segments separated by two orthogonal axes of division (e.g., aligned with the azimuth and elevation axes). The light intensity as a function of time for pairs of corresponding detector halves (e.g., top, bottom, left and right halves) is determined from the return signals of the respective detector segments. The target linear velocity is further partitioned into an azimuth vector and an elevation vector. The azimuth vector represents the velocity of the speckle pattern normal to the azimuth axis (e.g., motion between the left and right detector halves) and the elevation vector represents the velocity of the speckle pattern normal to the elevation axis (e.g., motion between the top and bottom detectors). The time required for the speckle pattern to move between orthogonal pairs of corresponding detector halves gives the magnitude and sign of the component vectors of the target's linear velocity. With the azimuth and elevation vectors so determined, the linear and rotational velocity of the target may be determined.

As discussed in greater detail below, these times may be determined by cross-correlating the measured intensity as a function of time (e.g., speckle pattern) for the detector halves. The cross-correlation provides a measure of the similarity of the speckle patterns at each detector half for a given time delay between the two patterns and exhibits a maximum at the time delay for which the two speckle patterns are most similar. Physically, this time delay represents the time required for the speckle pattern to move from one detector half to its corresponding detector half. Accordingly, the cross-correlation may be calculated in light of the coordinate system adopted for the physical layout of the respective detector halves such that a negative time delay is provided for movement of the speckle pattern in negative directions (e.g., from right to left detector halves and top to bottom detector halves). Thus, in the second embodiment, the time delay of the cross-correlation maximum between top and bottom detector halves may be employed as the magnitude of the elevation vector. Likewise, the time delay of the cross-correlation maximum between left and right detector halves may be employed as the magnitude of the elevation vector.

Figure 1B:
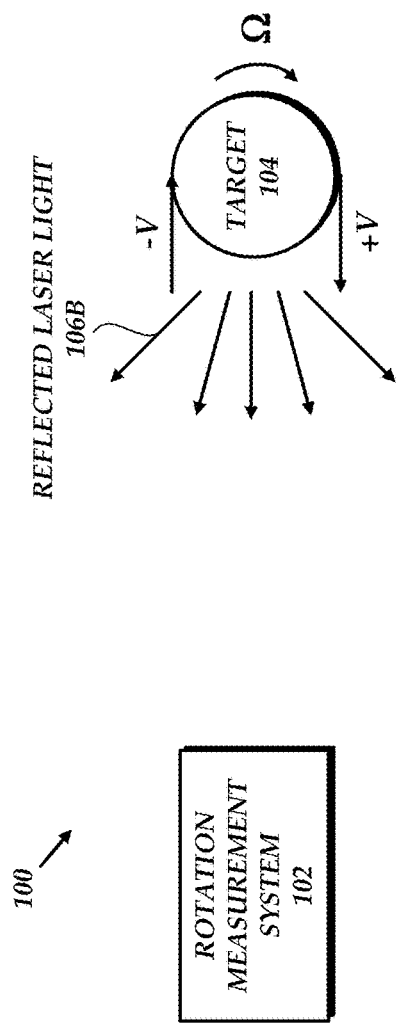

The discussion will now turn to FIGS. 1A-1B, which present an illustrative environment 100 including a rotation measurement system 102 illuminating a rotating target 104 with incident laser light 106A. The target 104 possesses a diameter, D, perpendicular to the axis of rotation, and rotates at angular velocity, $\Omega$. The measurement system 102 transmits laser light 106A incident upon the target 104 (FIG. 1A) and measures the laser light reflected from the target 106B (FIG. 1B). Such measurements may include, but are not limited to, intensity and frequency. The reflected laser light 106B may also be referred to herein as return signal 106B.

The reflected laser light 106B will experience a Doppler shift due to the rotation of the object, where the amount of the Doppler shift is proportional to the radial component of the surface velocity of the rotating target 104. At the extreme edges of the target 104, the radial component of the surface velocity, V, is given by Equation (1):

$$V = \pm D\Omega/2 \tag{1}$$

where +V is the radial component of the surface velocity at the edge of the target 104 rotating towards the system 102 and −V is the radial component of the surface velocity at the edge of the target 104 rotating away from the system 102. In view of Equation 1, it may be further understood that locations nearer to the center of the target 104 will exhibit radial components of the surface velocity smaller than V, approaching zero at center of the target 104. Thus, the Doppler shift experienced by the reflected laser light 106 will depend upon the location of the target 104 from which it reflects.

A consequence of this variation in the Doppler shift is that the reflected light intensity measured by the rotation measurement system 102 will possess different frequencies, spread over a range, $\Delta f$, given according to Equation 2:

$$\Delta f = 2/\lambda \cdot 2V = 2/\lambda \cdot D\Omega \tag{2}$$

An embodiment of the rotation measurement system 102 is illustrated in greater detail in FIG. 2. In an embodiment, the system 102 is capable of performing coherent or heterodyne detection of the coherent light reflected from the target object 104. Optical frequencies oscillate too rapidly for direct electronic measurement and analysis of the electric field of the return signal. Heterodyne detection is a process that converts the modulation of the reflected light into the same modulation on an electric current on a frequency less than that of the reflected light. Accordingly, heterodyne detection facilitates measurement of the return signal (e.g., relative phase, frequency, and/or amplitude of the return signal).

Figure 2A:
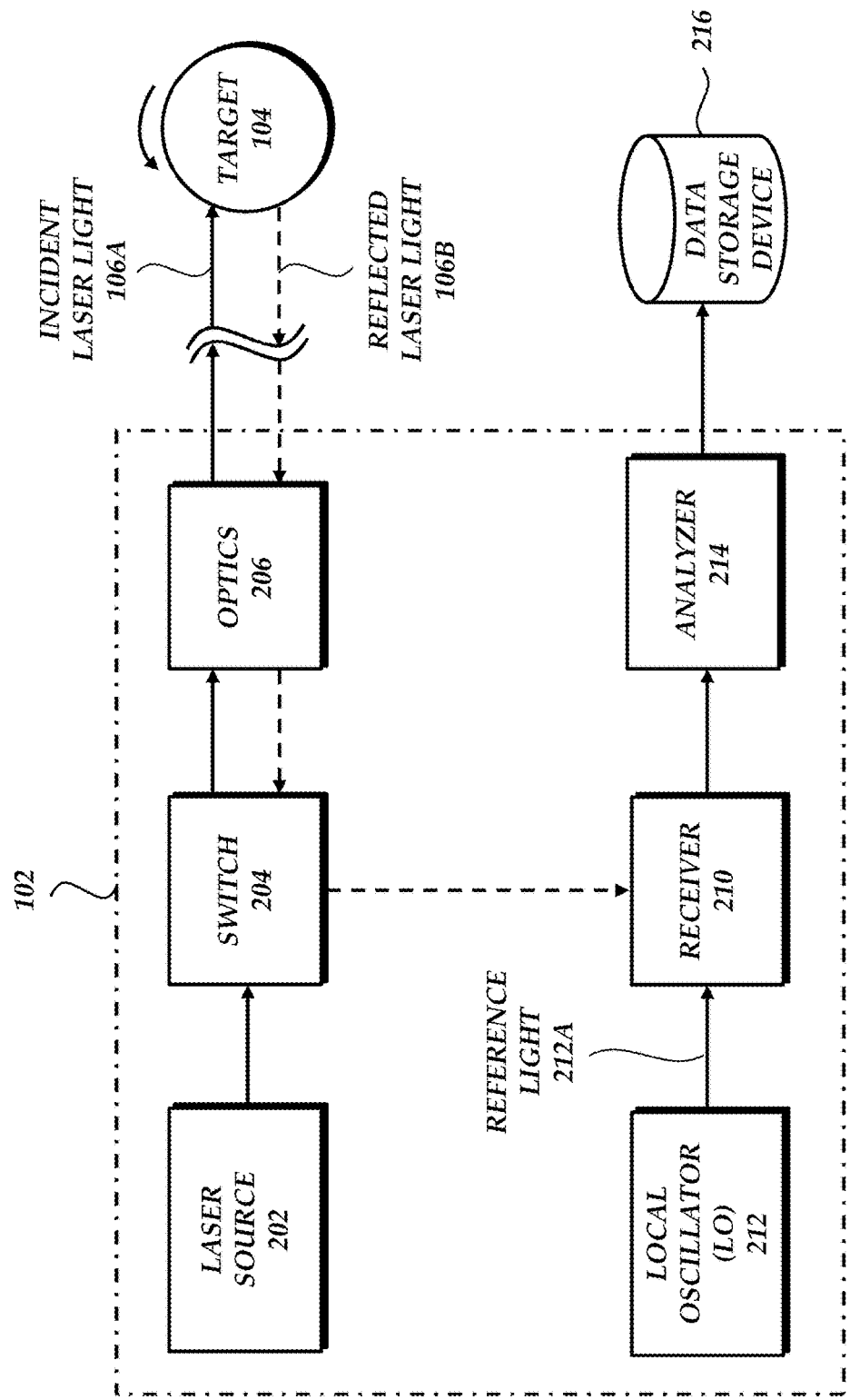
FIG. 2A is a block diagram illustrating components of an embodiment of the rotation measurement system of FIG. 1, including a receiver housing a light detector in communication with an analyzer.
Figure 2B:
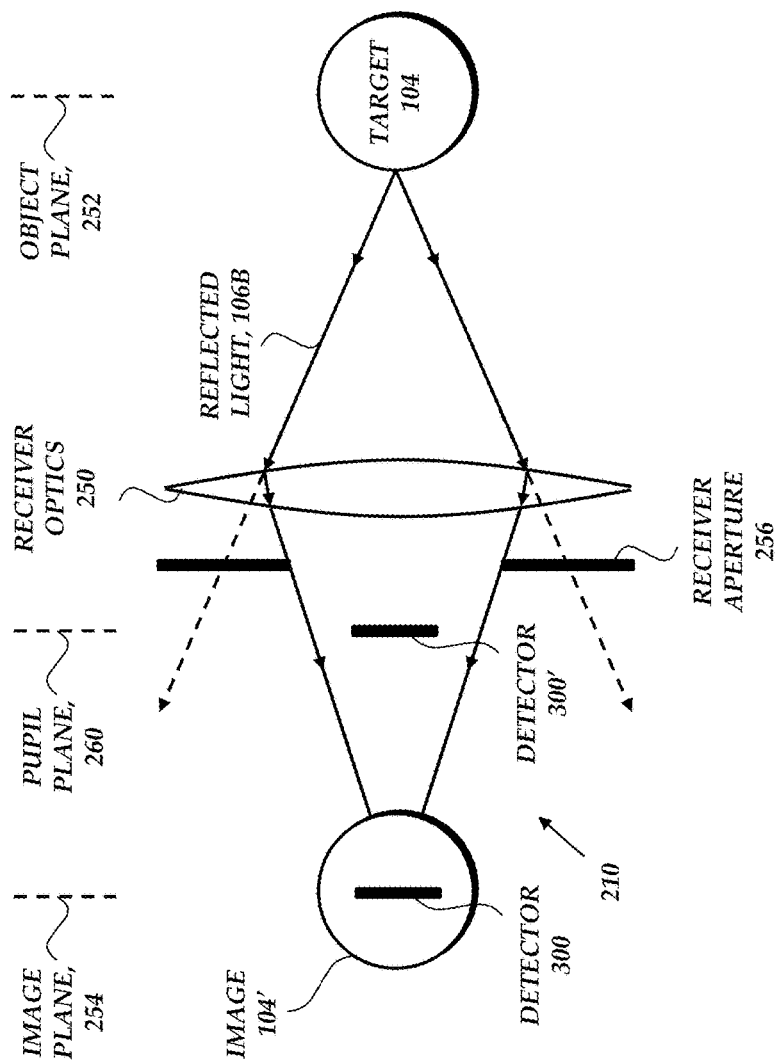
FIG. 2B is a schematic illustration of an embodiment of the receiver, demonstrating the positions of pupil and image planes at which the detector may be positioned.

As illustrated in the embodiment of FIG. 2A, the system 102 includes a laser source 202, a transmit/receive switch 204, optics 206, a receiver 210 housing a detector, a local oscillator (LO) 212, an analyzer 214, and a data storage device 216. Heterodyne detection utilizes the coherent or single frequency nature of the incident laser light 106A (electromagnetic wave) generated by the laser source 202 to down convert the modulation frequency of the reflected laser light 106B. In an embodiment, the laser source 202 may be adapted to emit laser light 106A having a wavelength selected within the range between the ultraviolet and far infrared regions of the electromagnetic spectrum (e.g., from about 100 nm to about 15 µm). In alternative embodiments, the wavelength of the laser light 106A may be selected within the range of wavelengths that are understood to be safe for viewing by the human eye (e.g., within the range between about 1 µm to about 2 µm). In another embodiment, the wavelength of the laser light 106A may be selected within the range between about 1.5 µm to about 2 µm. In further embodiments, the laser source 202 may output laser light 106A at a power within the range between about 1 W to about 10 kW. For example, the laser source 202 may output laser light 106A at a power within the range between about 1 W to about 500 W.

The incident and reflected laser lights 106A, 106B are directed by the transmit/receive switch 204 and optics 206.

In an embodiment, the switch 204 is an optical transmit/receive switch adapted to separate transmission of the incident light 106A from the laser source 202 to the target 104, reception of the reflected light 106B, and direction of the reflected light 106B to the receiver 210 housing the detector. In a further embodiment, the optics 206 are configured to collimate the incident laser light 106A towards the target 104 and focus the reflected light 106B onto the receiver 210.

The reflected laser light 106B so directed is made to interfere with a second coherent reference light 212A, generated by the local oscillator 212. The result of this interference (e.g., laser interference fringes) is detected at the receiver 210. In order for the reflected and reference lights 106B, 212A to interfere, the reference light 212A emitted by the LO 212 is both temporally coherent and spatially coherent. For example, the temporal coherence of the reference light 212A may possess a coherence time greater than or equal to the time interval over which the interference between the reflected and reference lights 106B, 212A is measured by the detector 300 (located at receiver 210). The spatial coherence of the reference light 212A may be characterized by a coherence diameter greater than or equal to the diameter of the aperture of the receiver 210. As discussed herein, reference to detection of reflected laser light or return signal 106B may include detection of the interference of reflected light 106B and reference lights 212A.

As discussed in greater detail below, the detector 300 performs heterodyne detection of the return signal 106B and outputs a plurality of electrical signals representing the intensity as a function of frequency of the reflected light 106B to the analyzer 214. With this information, the analyzer 214 may determine the rotation magnitude and rotation direction of the target object 104. The analyzer 214 may be incorporated within the receiver 210 or operate as a separate component of the system 102. Once determined, the rotation magnitude and rotation direction of the target object 104 may be further transmitted to data storage device 216 for storage and subsequent retrieval. Alternatively or additionally, the determined rotation magnitude and rotation direction of the target object 104 may be transmitted to another system for further analysis (e.g., inverse synthetic aperture and tomography).

The data storage device 216 may include any storage device capable of maintaining the determined rotation magnitude and rotation direction of the target object 104. The data storage device 216 may further maintain additional information for use by the analyzer 214 for calculation of the target rotation direction and/or rotation magnitude (e.g., Δf, λ, D, measured Doppler spreads, etc.). Examples include, but are not limited to, magnetic and solid state storage devices. The data storage device 216 may be in local communication with the system 102 or remote communication via a network.

Embodiments of the detection system 102 may be further configured with the detector 300 at different positions within the receiver 210. Examples of different detector positions are illustrated with regards to FIG. 2B. For example, ignoring the switch and reference light for the sake of simplicity, consider the target 104 as positioned on one side of receiver optics 250 (e.g., a plurality of receiver lenses) at object plane 252. The receiver optics 250 focus the reflected light 106B received at the receiver onto an image 104' positioned at the image or focal plane 254 of the receiver optics 250, passing through a receiver aperture 256. In one embodiment, detector 300, discussed below in regards to FIG. 3, may be positioned at the image plane 254. In an alternative embodiment, detector 300' may be positioned at a pupil plane 260, where the receiver aperture is re-imaged, rather than at the image plane 254. As discussed in greater detail below, the return signal 106B measured at the image plane 254 and analyzed by the analyzer 214 as discussed with respect to FIGS. 3-7B or measured at the pupil plane 260 and analyzed by the analyzer 214 as discussed with respect to FIGS. 8-11C to determine the target rotation characteristics.

The discussion below will provide a brief description of the heterodyne detection process. For example, assume that the return signal 106B is given by $A(t)\sin(\omega t+\theta)$, where $A(t)$ is the amplitude of the electromagnetic field at time t, $\omega$ is the frequency of the signal carrier frequency, and $\theta$ is the phase of the return signal 106B with respect to the reference light 212A. Further assume that LO 212 is a continuous laser emitting reference light 212A at an optical frequency $\omega'$, slightly different than signal carrier frequency $\omega$. The reference light 212A may be expressed by $B \sin(\omega't)$. The sum of the two fields (e.g., 106B and 212A) at the face of the detector 300 (or detector 300') is given by Equation 3:

$$\text{Total Field}=A(t)\sin(\omega t+\theta)+B \sin(\omega't) \quad (3)$$

The current (i) generated by the detector 300 (or detector 300') upon incidence of the interference between the reflected and reference lights 106A, 212A is proportional to the total field squared (Equations 4, 5):

$$i \propto [A(t)\sin(\omega t+\theta)+B \sin(\omega't)]^2 \quad (4)$$

$$i \propto A(t)^2 \sin^2(\omega t+\theta)+B^2 \sin^2(\omega't)+2A(t)B \sin(\omega t+\theta)\sin(\omega't)=A(t)^2 \sin^2(\omega t+\theta)+B^2 \sin^2(\omega't)+A(t)B[\cos((\omega-\omega')t+\theta)-\cos((\omega+\omega')t+\theta)] \quad (5)$$

Define the difference in optical carrier frequencies $\omega$ and $\omega'$ as intermediate frequency $\omega_{if}$ (Equation 6):

$$\omega_{if}=(\omega-\omega')/2\pi \quad (6)$$

To simplify Equation 6, additional assumptions can be employed. Assume that the detector intrinsic frequency response eliminates the double frequency components of Equation 5, $\cos(\omega+\omega')$. Further assume that the intensity of the reference light 212A is much larger than that of the reflected light, such that B>>A. As a result, the term $A(t)^2 \sin^2(\omega t+\theta)$ in Equation 5 is much less than $B^2 \sin^2(\omega't)$ and can be ignored. Additionally assume that a high pass filter eliminates the DC term $B^2 \sin^2(\omega't)$ in Equation 5 due to the reference light 212A. With these assumptions, Equation 5 may be represented as Equation 5':

$$i \propto A(t)B \cos(\omega_{if}t+\theta) \quad (5')$$

Two features are apparent from Equation 5'. First, the amplitude, B, of the field of the reference light 212A, appears as a gain multiplier of the amplitude, A, of the field of the reflected light, 106B. Second, provided that the LO carrier frequency, $\omega'$, is well known, $\omega_{if}$ represents the frequency of the return signal 106B down shifted to an electronically accessible sampling level as well as its phase, $\theta$. In other words, the changes in the frequency of the return signal 106B due to a target reflection, such as the Doppler shift, can be measured using common electronic components.

Figure 3:
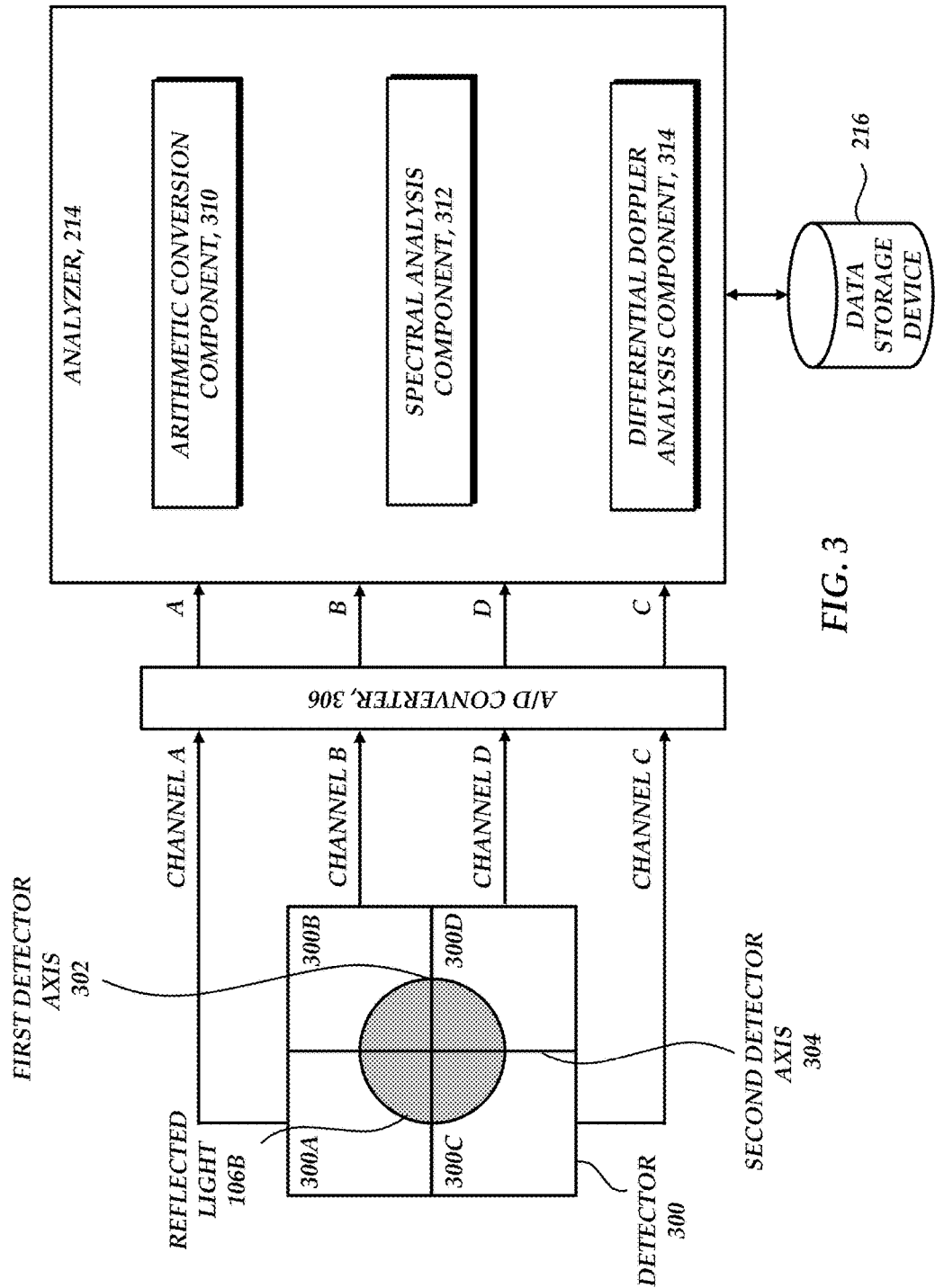
FIG. 3 is a block diagram illustrating embodiments of the detector and analyzer of FIG. 2.

The discussion will now turn to FIG. 3, which illustrates embodiments of the detector 300 (positioned at the image plane 254 of the receiver optics 250) and analyzer 214 in greater detail. The detector 300 possesses a field of view divided into a plurality of spatially distinct light sensing segments (i.e., a detector array). In certain embodiments, the detector 300 may possess at least three light sensing segments. For the purposes of the discussion, the detector 300 will be described with four sensing segments, 300A, 300B, 300C, 300D, separated along orthonormal detector axes of division 302, 304. So configured, the detector segments are oriented as quadrants of the total detector field of view (e.g., a 2×2 array), as illustrated in FIG. 3.

As further discussed below, the return signals 106B measured by each respective detector segment may be combined. For example, with continued reference to FIG. 3, combining the respective return signals 106B of any two segments will provide a return signal for half of the detector. Using the detector axes of division 302, 304 to define different detector halves, four different detector halves may be identified, each combining the return signals of two different pairs of detector segments. For example, a first detector half (e.g., a top detector half) is formed from the combination of detector segments 300A/300B. Similarly a second half (e.g., a bottom half), a third half (e.g., a left half), and a fourth half (e.g., a right half) may be formed from the combination of detector segments 300C/300D, 300A/300C, and 300B/300D, respectively. As discussed herein, corresponding or complementary detector halves may be detector halves separated by a detector axis of division (e.g., top and bottom halves or left and right halves). Alternatively stated, the complementary detector halves do not overlap.

In alternative embodiments, the type of detector, the number of detector segments, and the relative orientation of the detector segments may be varied. For example, in certain embodiments, the detector segments may be linear detectors or Geiger mode avalanche photodiode detectors (GMAPDs). In further embodiments, the detector may include larger numbers of segments arranged in an array (e.g., a 4×4 array, a 5×5 array, etc.). In such larger arrays, quadrants of the detector may be defined by synthesizing the output of detector segments positioned within the respective physical quadrants of the detector. For example, in a 4×4 array, quadrants may be formed from 2×2 sub-arrays.

Each of the detector segments 300A-300D independently performs heterodyne detection of the return signal 106B received at its respective portion of the detector field of view and outputs, along respective channels (channels A-D), a plurality of signals (e.g., current) representative of intensity and frequency of the return signal 106B detected at each detector segment 300A-300D. For example, as discussed above, the plurality of signals output by the detector 300 may include a plurality of currents having the same modulation as the return signal 106B with a carrier frequency $\omega_{if}$.

Figure 4A:
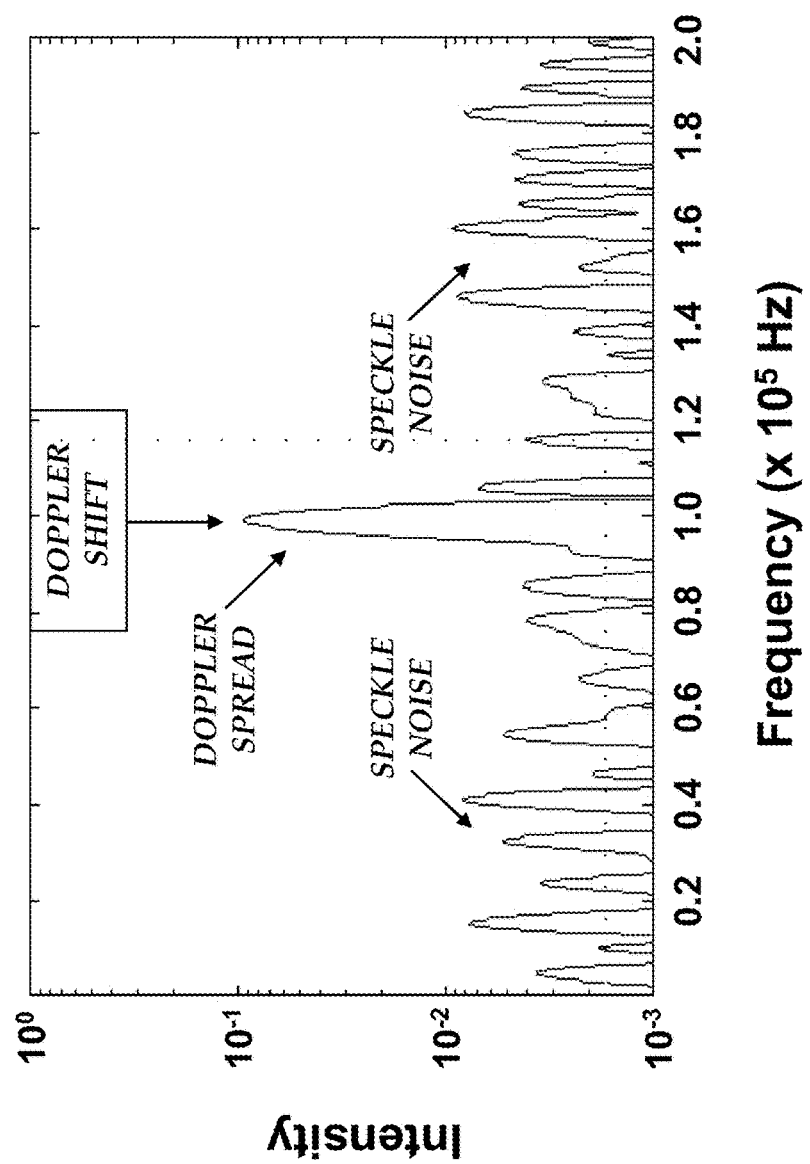
FIGS. 4A-4B illustrate simulated return signals measured according to embodiments of the disclosure; (A) single Doppler spread measured over a coherent integration time; (B) incoherent average of multiple Doppler spreads, each measured over the coherent integration time.
Figure 4B:
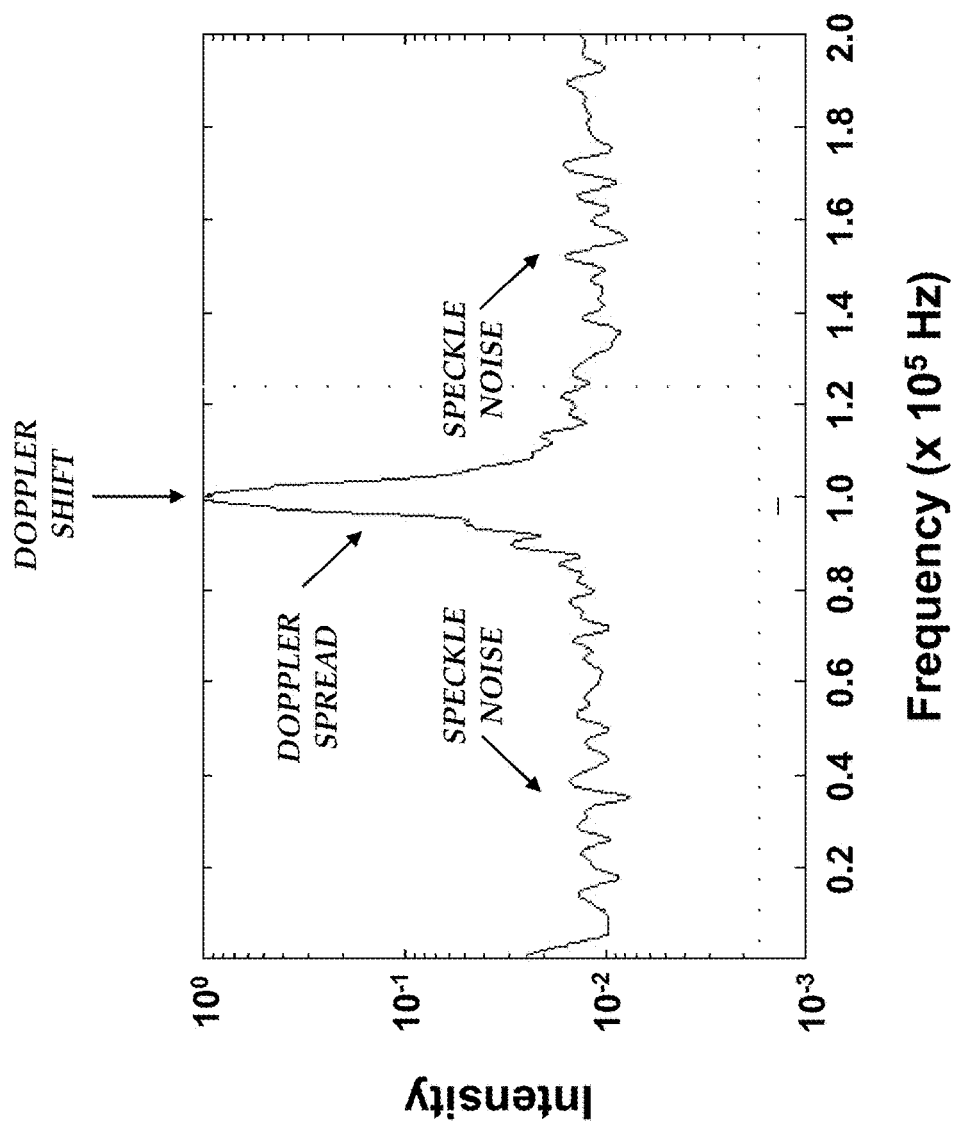

The discussion will now turn to FIGS. 4A-4B, which illustrate exemplary measurements of return signals 106B when the detector 300 is positioned at the image plane 254 of the receiver optics 250. Further discussion of the measurement of return signals 106B when the detector 300' is positioned at the pupil plane 260 of the receiver optics 250 is found below in regards to FIG. 9.

A simulation of a return signal 106B including intensity (arbitrary units) as a function of frequency is illustrated in FIG. 4A. The simulation assumes heterodyne detection of the return signal 106B over a coherent integration time (CIT) and a Doppler spread given by Equation 2. The simulation further assumes Lambertian (diffuse) reflection of the incident laser light 106A, which is characteristic of targets 104 having a relatively rough surface and causes the reflected laser light 106B to be modulated with random amplitude changes, also referred to as speckle. As a result, the return signal of FIG. 4A is an intensity distribution, characterized by an intensity maximum or peak and a width extending over range of frequencies to either side of the peak. The frequency of the intensity peak is referred to as the Doppler shift, while the intensity distribution as a whole may be referred to as a Doppler spread. Speckle noise resulting from Lambertian reflection is also illustrated.

Notably, for a single measurement of the return signal 106B, such as FIG. 4A, the amplitude of the speckle noise is a significant fraction of the amplitude of the Doppler spread. However, the Doppler spread is approximately constant in time, while the speckle noise is random. Accordingly, the return signal 106B may be heterodyne detected over multiple coherent integration times and averaged, as illustrated in the embodiment of FIG. 4B, to improve the signal to noise ratio. For example, the average may be an incoherent average, where the magnitude of each measured return signal 106B is squared and added together. As shown in FIG. 4B, this averaging may significantly increase the amplitude of the Doppler spread as compared to that of the speckle noise. As a result, error in the target rotation magnitude and direction calculated from measurements of the return signal 106B may be reduced.

In certain embodiments, the plurality of signals output by the detector 300 may be provided to an analog to digital converter (e.g., A/D converter 306, FIG. 3) prior to receipt by the analyzer 214 (e.g., Channels A, B, C, D). The A/D converter 306 may convert the output current (or corresponding voltage) to a representative digital number. The output of the A/D converter 306 may be received by the analyzer 214 for determining the rotation magnitude and direction of the target object 104.

In an embodiment, the analyzer 214 may include one or more processors adapted for analyzing the plurality of signals measured by the detector 300. For the purpose of discussion, the analyzer 214 may be the represented as components or modules capable of performing one or more analysis operations. However, it may be understood that such analysis operations are performed in hardware, software, and/or combinations thereof by the one or more processors.

The discussion will now turn to discussion of operations performed by the analysis component 214 for determination of the target rotation direction and magnitude when the detector 300 is positioned at the image plane 254 in reference to the embodiments of FIGS. 5A-5B, 6A-6B, and 7A-7B. Discussion of operations performed by the analysis component 214 for determination of the target rotation direction and magnitude when the detector 300' is positioned at the pupil plane 260 are in reference to the embodiments of FIGS. 10A-10C and 11A-11C.

To perform the analysis, a rotation convention for the target rotation is chosen that defines a vector to represent the rotation direction. For the purpose of example, a right-hand rule will be employed in the discussion below. However, it may be understood that embodiments of the disclosure may be employed in combination with other rotation conventions, without limit. With a right-hand rule, the right hand is oriented such that fingers curl towards the palm in the direction of target rotation. The outstretched tip of the thumb of the right hand is pointed in the direction of the axis of rotation vector. The two-dimensional projection of the axis of rotation vector on a plane may be represented as the sum of two orthogonal vectors, each having a magnitude and a sign (i.e., positive or negative).

As discussed in detail below, measurement of the return signals 106B by the detector 300 may be employed to determine this two-dimensional projection of the target rotation vector. For example, assume the first vector is aligned with the first detector axis of division 302 and the second vector is aligned with the second detector axis of division 304. The component of the target rotation described by rotation about an axis aligned with the first detector axis of division 302 will be manifested as a difference between the Doppler shift of the top and bottom halves of the detector. Similarly, the component of target rotation described by rotation about an axis aligned with the second detector axis of division 304 will be manifested as a difference between the Doppler shift of the left and right halves of the detector 300. Thus, comparison of the Doppler spreads for the corresponding halves of the detector 300 defined by the detector axes of separation 302, 304 allows target rotation to be spatially discriminated. Furthermore, as discussed in greater detail below, measurement of the width total Doppler spread over the entire field of view of the detector 300 characterizes the magnitude of the target rotation.

The analyzer 214 may include an arithmetic conversion component 310, a spectral analysis component 312, and a differential Doppler analysis component 314 for use in analyzing the return signals 106B received from the detector 300. For example, the arithmetic conversion component 310 may be employed to combine the measured return signals 106B of respective detector segments and provide the Doppler spreads for respective halves of the detector 300. In certain embodiments, the Doppler spreads for respective detector halves may be determined by coherent addition of the Doppler spread of each detector segment forming a respective detector half.

The embodiments of FIGS. 5A and 6A illustrate division of the detector 300 into pairs of corresponding halves along orthogonal axes. For example, with respect to FIG. 5A, first detector axis of division 302 divides a first detector half, formed by segments 300A and 300B, from a second detector half, formed by detector segments 300C and 300D. The analyzer 214 (e.g., using arithmetic conversion component 310) may determine first and second Doppler spreads for reflected light received at the first and second halves of the detector 300 by coherently adding the Doppler spreads measured for the detector segments 300A and 300B and the Doppler spreads measured for the detector segments 300C and 300D, respectively.

As further illustrated in FIG. 6A, a third detector half, formed by segments 300A and 300C, is divided from a fourth detector half, formed by detector segments 300B and 300D, by the second detector axis of division 304. The analyzer 214 (e.g., using arithmetic conversion component 310) may determine third and fourth Doppler spreads for reflected light received at the third and fourth halves of the detector 300 by coherently adding the Doppler spreads measured for the detector segments 300A and 300C and the Doppler spreads measured for the detector segments 300B and 300D, respectively.

In certain embodiments, the Doppler spreads calculated for the detector segment halves may be further normalized in order to account for variations in signal sensitivity between the different detector segments. For example, the normalization may be the Doppler spread over the total field of view of the detector 300 (e.g., the coherent sum 300A+300B+300C+300D). Thus, the Doppler spread for the first detector half may be given by (300A+300B)/(300A+300B+300C+300D), while the Doppler spread for the second detector half may be given by (300C+300D)/(300A+300B+300C+300D).

In certain embodiments, the first detector axis of division 302 may be referred to an elevation axis and the second detector axis of division 304 may be referred to as an azimuth axis. Furthermore, reference may be made to the first and second detector segments forming an upper detector half, the third and fourth detector segments forming a lower half of the detector, the first and third detector segments forming a left detector half, and the second and fourth detector segments forming a right detector half. It may be understood, however, that such orientations are provided for illustrative purposes and that embodiments of the disclosed systems and methods may be employed with any desired orientation.

In further embodiments, comparison of the Doppler shifts between corresponding detector halves may identify the presence of a portion of the target rotation occurring about an axis aligned with the detector axis of separation. In general, if a component of the target rotation occurs about the detector axis of division between the respective detector halves, the Doppler shifts of the two Doppler spreads will be offset.

For example with reference to FIGS. 5B and 6B, the Doppler spreads of the corresponding detector halves (e.g., top/bottom and left/right, respectively) are illustrated. It may be observed with respect to FIG. 5B that the Doppler spread for the first half of the detector (300A+300B) exhibits a negative Doppler shift, as compared to the Doppler spread for the second half of the detector (300C+300D). In contrast, with reference to FIG. 6B, the Doppler spread for the third half of the detector (300A+300C) is nearly identical to the Doppler spread for the fourth half of the detector (300B+300D), with no Doppler shift difference observed.

The analyzer 214 (e.g., the differential Doppler analysis component 314) may detect the presence of target rotation by examining the Doppler spread difference between corresponding detector halves. For example, as further illustrated in FIG. 5B, the Doppler spread difference between the top and bottom halves exhibits a pronounced rise and fall, with opposing peaks joined by a non-zero slope crossing the line of zero intensity, referred to herein as a zero crossing. The analyzer 214 (e.g., the differential Doppler analysis component 314) may detect the presence of this differential Doppler zero crossing by detecting the opposing peaks with the zero crossing point lying there between. In contrast, as illustrated in FIG. 6B, the Doppler spread difference between left and right halves exhibits no zero crossing. The analyzer 214 (e.g., the differential Doppler analysis component 314) may detect the absence of this differential Doppler zero crossing by detecting the absence of opposing peaks with the zero crossing point lying there between.

The magnitude of the component vectors of the target rotation axis reflect the relative degree to which the target rotation axis is aligned with each of the detector axes of division 302, 304. This magnitude may be given by the Doppler shift difference of the Doppler spreads between the corresponding detector halves. In the present example, the first component vector is aligned with the first detector axis of division 302 and has a magnitude given by a first Doppler shift difference between the first and second detector halves. Likewise, the second component vector is aligned with the second detector axis of division 304 and has a magnitude given by a second Doppler shift difference between the third and fourth detector halves.

The analyzer 214 may further analyze the Doppler spreads in order to determiner the Doppler shift differences between corresponding detector halves and, therefore, the magnitudes of the component vectors of the target rotation axis. For example, the analyzer (e.g., the spectral analysis component 312) may identify the peak in each of the Doppler spreads of the first and second detector halves and calculate the frequency difference (i.e., phase difference)

between the two peaks. As the Doppler shift of each Doppler spread is the peak frequency, this difference directly measures the Doppler shift difference.

The sign of the component vectors of the target rotation axis are determined according to the assumed rotation convention. Following a right handed rule convention, rotation towards the bottom or right detector halves indicates a positive first or second vector, respectfully. Similarly, rotation towards the top or left detector halves indicates a negative first or second vector, respectfully. The analyzer 214 (e.g., spectral analysis component 312) may identify the detector halves demonstrating a positive Doppler shift and apply the appropriate sign to the component vector. In the context of the present example, the rotation observed towards the bottom detector half indicates that the first vector points in the negative direction, from right to left. In the context of the example, as the second vector has no magnitude (i.e., no rotation towards the right or left detector half) and, therefore, it is not necessary to determine its sign.

Having determined the magnitude and direction of the two vector components of the target rotation axis vector, the analyzer 214 (e.g., the arithmetic conversion component 310) may identify the rotation axis of the target as the sum of two vector components. For example, continuing the current example, the sum of the first and second vectors is the first vector, as the second rotation vector is zero. Thus, direction of the target rotation axis is given by the direction of the first rotation vector.

Figure 7A:
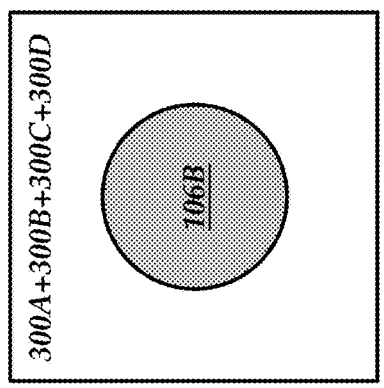
FIGS. 7A-7B illustrate return signal measurement over the entire field of view of the detector of FIG. 3 according to embodiments of the disclosure; (A) detector; (B) Doppler spread.
Figure 7B:
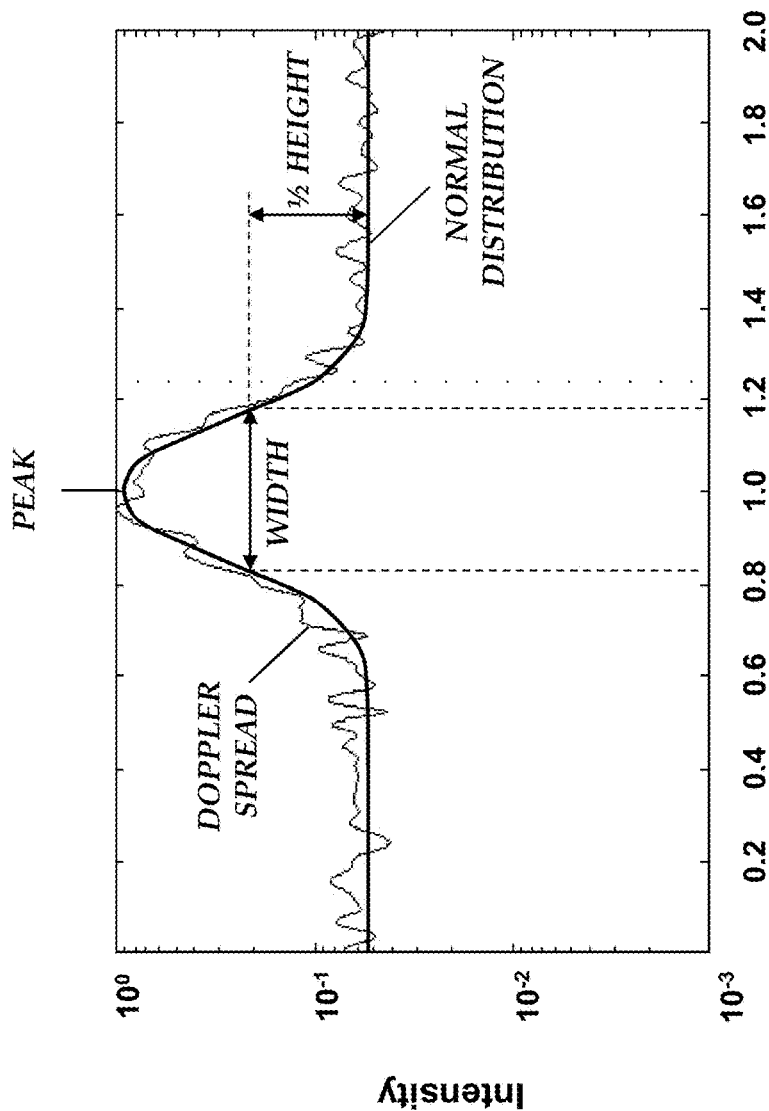

The discussion will now turn to calculation of the target rotation magnitude, with reference to FIGS. 7A-7B. As discussed above with respect to Equation 2, $\Delta f = 2D\Omega/\lambda$, the magnitude of the target rotation, $\Omega$, is based upon the width of the Doppler spread of the return signal 106B received over the field of view of the detector 300, $\Delta f$. Thus, with measurement of $\Delta f$, knowledge of the wavelength of the incident light 106B, $\lambda$, and the target diameter, D, the analyzer 214 may calculate the target rotation magnitude, $\Omega$. It may be understood that the wavelength of the incident and reflected light may be assumed to be approximately equal Assuming that the target 104 is barely resolved when the return signal 106B is measured by the detector 300, D may be taken to be approximately the resolution of the optics 206. This value of D may be provided to the analyzer 214 or retrieved from the data storage device 216.

The Doppler spread of the return signal 106B received over the field of view of the detector 300 may be determined by combining the Doppler spreads measured for each detector segment (FIG. 7A). For example, the analyzer 214 (e.g., spectral analysis component 210) may calculate the total Doppler spread over the entire detector field of view by coherently adding the Doppler spreads of the return signal 106B detected by each of the detector segments (e.g., segments A-D).

With the total Doppler spread, the width of the total Doppler spread may be characterized by the full width at half maximum (FIG. 7B). The analyzer 214 (e.g., spectral analysis component 312) may further calculate the width of the total Doppler spread, $\Delta f$, by identifying the peak in the total Doppler spread and fitting the Doppler spread to a function (e.g., a normal distribution). For example, the spectral analysis component 312 may perform a Fourier analysis (e.g., a Fourier transform, fast Fourier transformation (FFT), or discrete Fourier transform (DFT) on the total Doppler spread and identify the peak of the Doppler spread (i.e., the Doppler shift) in the frequency domain. The width of the Doppler spread may be defined by the full width of the function at half the intensity of the peak. Thus, with measurement of $\Delta f$ and knowledge of D and $\lambda$, the target rotation magnitude, $\Omega$, may be calculated according to Equation 2.

The discussion will now turn to embodiments of the second detection technique, where the frequency spread observed in the return signal 106B reflected from the rotating target 104 is characterized by amplitude modulation due to motion of a speckle pattern across the plane of the detector 300'.

As discussed above with regards to FIG. 2B, if the detector 300' is positioned at the pupil plane 260 of the receiver 210 (see, e.g., detector 300'), where the receiver aperture 256 is re-imaged, the detector 300' "sees" a random intensity change as the light amplitude varies due to the random intensity of the speckle pattern moving across the detector field of view. By employing a detector 300' having multiple detector segments for measurement of the return signal 106B, it is possible to determine the direction of motion of the pattern.

Figure 8:
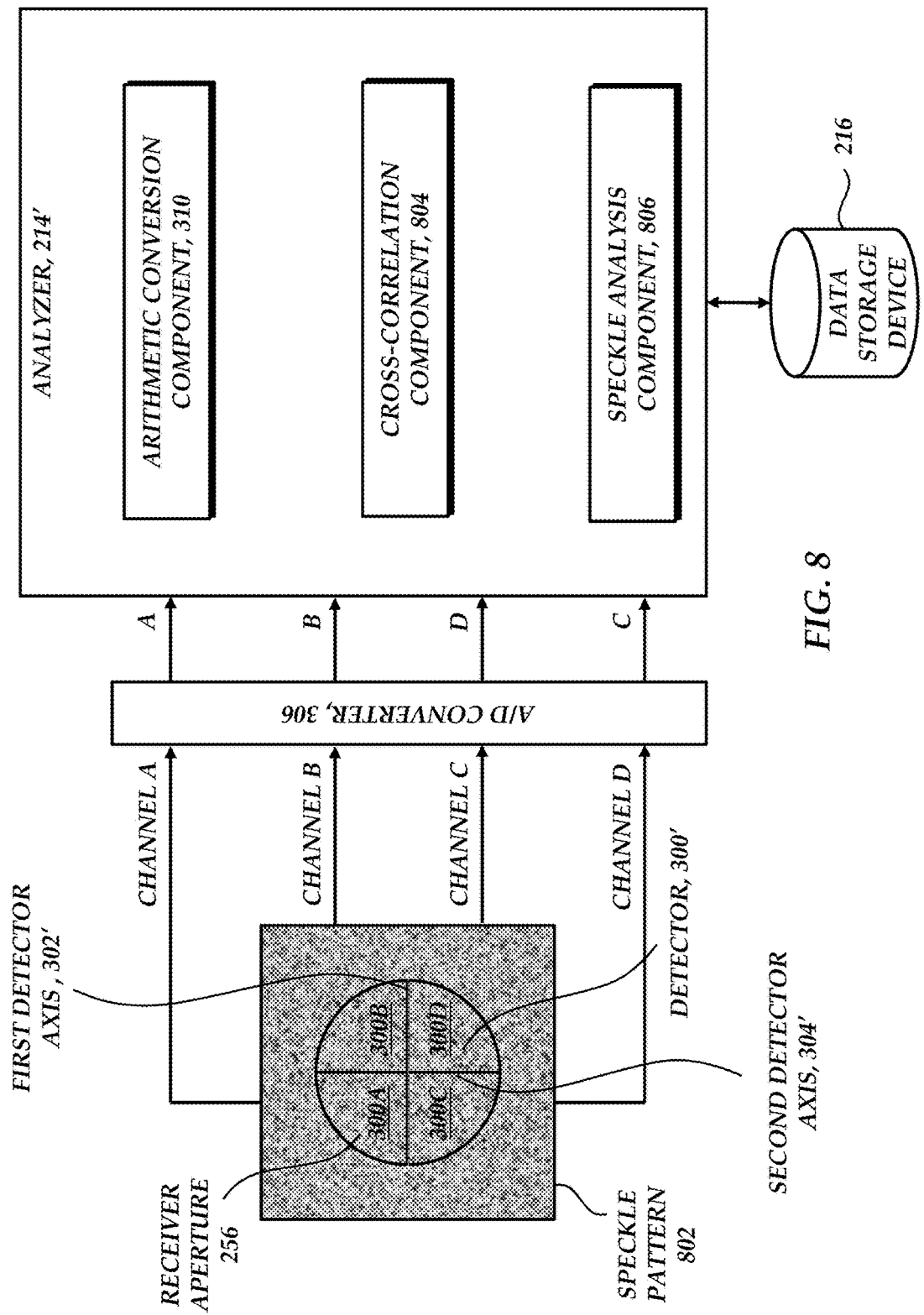
FIG. 8 is a block diagram illustrating an alternative embodiment of the detector and analyzer of FIG. 2.

For example, with reference to FIG. 8, embodiments of the detector 300' are illustrated in combination with an analyzer 214' in greater detail. The detector 300' possesses a field of view divided into a plurality of spatially distinct light sensing segments (i.e., a detector array). In certain embodiments, the detector 300' may possess at least three light sensing segments. For the purposes of the discussion, the detector 300' will be described with four sensing segments, separated along orthonormal detector axes of division 302', 304'. So configured, the detector segments are oriented as quadrants of the total detector field of view (e.g., a 2×2 array) with elements A, B, C, and D as illustrated in FIG. 8. The speckle pattern 802 re-imaged at the pupil plane 260 spans the receiver aperture 256, allowing each detector segment to measure the speckle pattern. Other than its position with respect to the receiver optics 250, embodiments of the detector 300' may be the same as those discussed with respect to detector 300.

Figure 9:
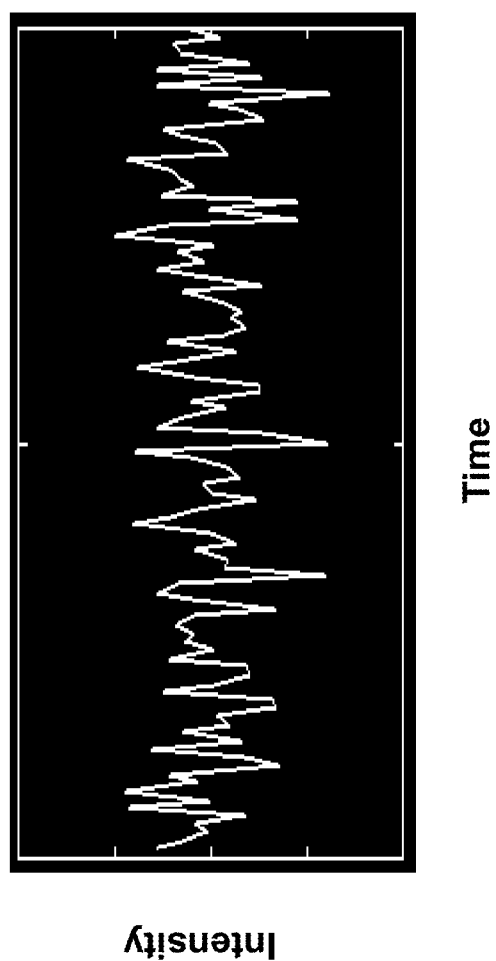
FIG. 9 illustrates a simulated return signal measured according to embodiments of the rotation measurement system of FIG. 8.

A simulation of a return signal 106B including intensity (arbitrary units) as a function of frequency is illustrated in FIG. 9. The simulation assumes heterodyne detection of the return signal 106B over a coherent integration time (CIT), and a Doppler spread given by Equation 2. The simulation further assumes Lambertian (diffuse) reflection of the incident laser light 106A, which is characteristic of targets 104 having a relatively rough surface and causes the reflected laser light 106B to be modulated with random amplitude changes (e.g., speckle). In certain embodiments, the plurality of signals output by the detector 300' may be provided to an analog to digital converter (A/D converter 306) prior to receipt by the analyzer 214' (e.g., Channels A, B, C, D), as discussed above.

The discussion will now turn to operations performed by the analysis component 214' for determination of the target rotation direction and magnitude when the detector 300' is positioned at the pupil plane 260 with further reference to FIG. 8 and the embodiments of FIGS. 10A-10C and 11A-11C. In an embodiment, the analyzer 214' may include one or more processors adapted for analyzing the plurality of signals measured by the detector 300'. For the purpose of discussion, the analyzer 214' may be the represented as components or modules capable of performing one or more analysis operations. For example, as illustrated in FIG. 8, the analyzer 214' includes an arithmetic conversion component 310, a cross-correlation component 804, and a speckle analysis component 806 for use in analyzing the return signals 106B received from the detector 300'. However, it may be understood that analysis operations discussed in the context of such component may be performed in hardware, software, and/or combinations thereof by the one or more processors.

The motion of the speckle pattern across the detector field of view may be partitioned into first and second orthogonal vectors. For example, the first vector is the component of speckle motion extending between the first and second detector halves separated by the first detector axis of division 302' and is aligned in a direction perpendicular to this first axis 302'. Similarly, the second vector is the component of speckle motion extending between the third and fourth detector halves separated by the second detector axis of division 304' and is aligned in a direction perpendicular to this second axis 304'.

The magnitude and sign of each vector may be further characterized by the delay in time between detection of the speckle pattern in corresponding detector halves. The magnitude and sign of the first vector is given by a first time delay between detection of the speckle pattern in the corresponding detector halves separated by the first detector axis of division 302' (e.g., the first and second detector halves). The magnitude and sign of the second vector is given by a second time delay between detection of the speckle pattern in the corresponding detector halves separated by the second detector axis of division 304' (e.g., the third and fourth detector halves).

In the discussion below, it will be assumed that the first and second detector axes of division 302', 304' are aligned with elevation and azimuth axes, respectively. With this orientation, the first vector is an elevation vector extending perpendicular to the elevation axis and describing the elevation component of the speckle motion. The magnitude and direction of the elevation vector is given by a first time delay between detection of the speckle pattern in the top and bottom detector halves. Likewise, the second vector is an azimuth vector extending perpendicular to the azimuth axis and describing the azimuth component of the speckle motion. The magnitude and direction of the azimuth vector is given by a second time delay between detection of the speckle pattern in the left and right detector halves.

Figure 10B:
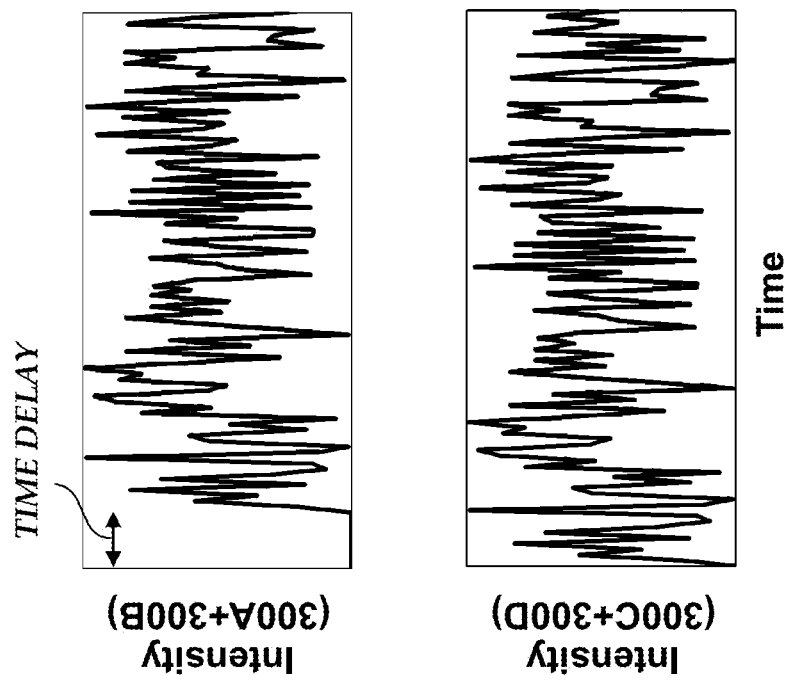
FIGS. 10A-10C illustrate return signal measurements over corresponding first and second halves of the detector according to embodiments of the rotation measurement system of FIG. 8; (A) first and second detector halves separated along a first detector axis (B) intensity-time plots for the first and second detector halves; (C) cross-correlation of the intensity-time responses of FIG. 10B.
Figure 10A:
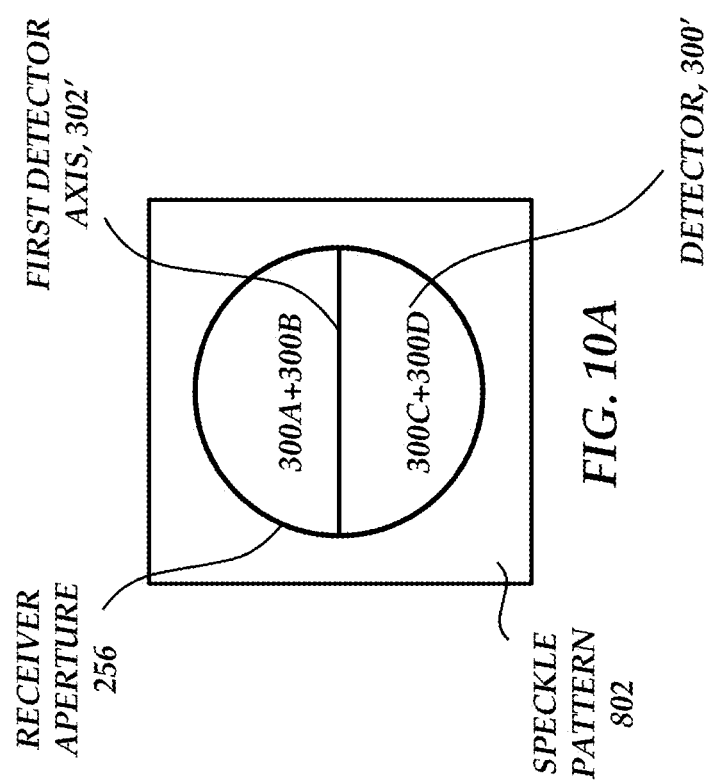
Figure 11B:
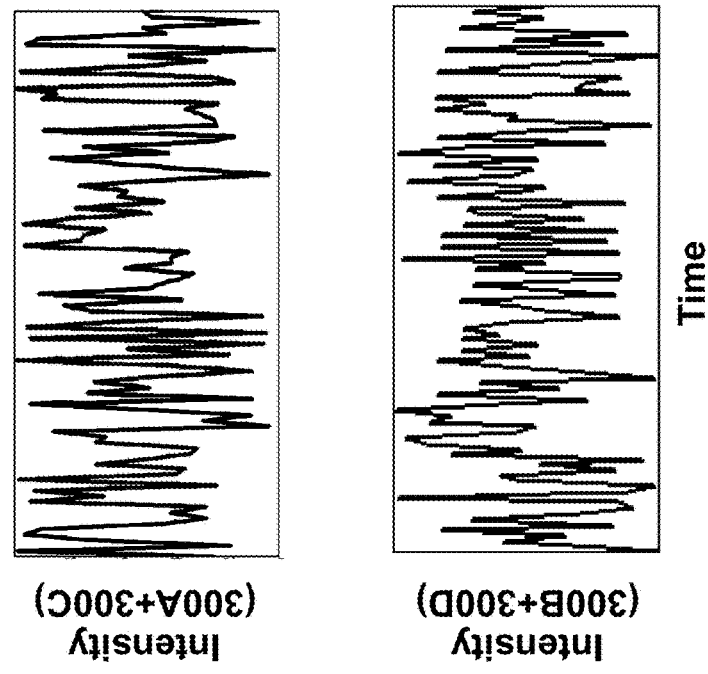
FIGS. 11A-11C illustrate return signal measurements over corresponding third and fourth halves of the detector according to embodiments of the rotation measurement system of FIG. 8; (A) third and fourth detector halves separated along a second detector axis (B) intensity-time plots for the third and fourth detector halves; (C) cross-correlation of the intensity-time responses of FIG. 11B.
Figure 11A:
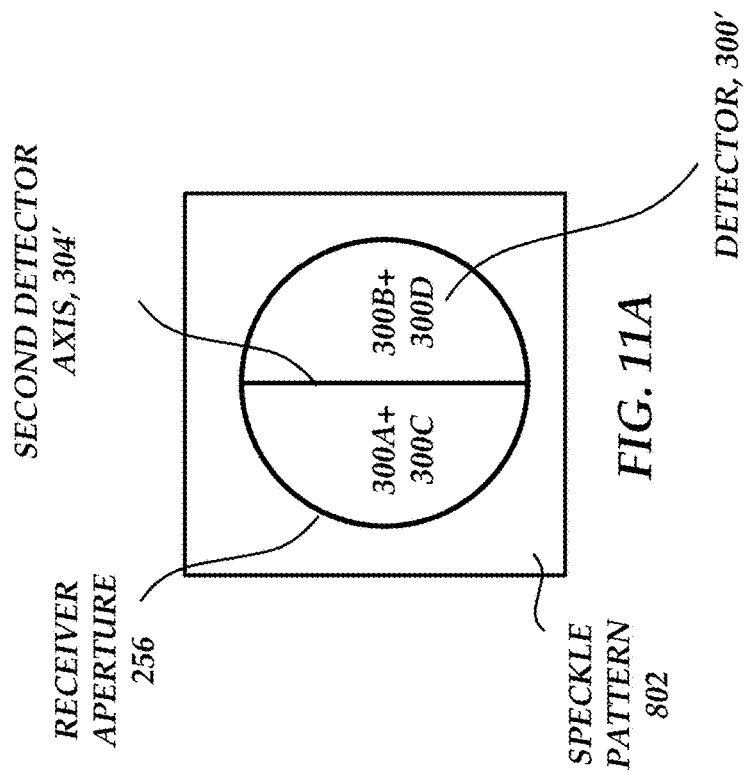

For example, embodiments of FIGS. 10A and 11A illustrate division of the detector 300' into pairs of corresponding halves along orthogonal axes. With respect to FIG. 10A, the first detector axis of division 302' (e.g., the elevation axis) divides the detector 300' into a first detector half, formed by segments 300A and 300B (e.g., a top detector half), from a second detector half, formed by detector segments 300C and 300D (e.g., a bottom detector half). As further illustrated in FIG. 11A, the second detector axis of division 304' (e.g., the azimuth axis) divides the detector 300' into a third detector half, formed by segments 300A and 300C (e.g., a left detector half), and a fourth detector half, formed by detector segments 300B and 300D (e.g., a right detector half).

The analyzer 214 (e.g., arithmetic conversion component 310) may determine the light intensity-time response for a given detector half by coherently adding the intensity-time response of its respective segments. For example, continuing the example above, a first light intensity-time response for reflected light received at the top half of the detector is given by the coherent sum of the intensity-time response measured by the detector segments 300A, 300B. A second light intensity-time response for reflected light received at the corresponding bottom half of the detector is given by the coherent sum of the intensity-time response measured by the detector segments 300C, 300D. Similarly, third and fourth light intensity-time responses for light received at the left and right halves of the detector are given by the coherent sums of the intensity-time response measured by detector segments 300A, 300C and 300B, 300D.

In certain embodiments, the light intensities calculated for the detector halves may be further normalized in order to account for variations in signal sensitivity between the different detector segments. For example, the normalization may be the light intensity measured over the total field of view of the detector 300' as a function of time (e.g., the coherent sum 300A+300B+300C+300D). Thus, the light intensity as a function of time for the first detector half may be given by (300A+300B)/(300A+300B+300C+300D), while the light intensify as a function of time for the second detector half may be given by (300C+300D)/(300A+300B+300C+300D).

Simulated intensity-time responses for the corresponding halves of the detector are illustrated in FIGS. 10B and 11B. FIG. 10B illustrates the intensity-time responses of the top detector half (300A+300B) and the bottom detector half (300C+300D), while FIG. 11B illustrates the intensity-time responses of the left detector half (300A+300C) and the right detector half (300B+300D). The simulations assume the limiting case where the target axis of rotation is aligned with the elevation axis of the detector. The target is further assumed to rotate towards the bottom half of the detector and away from top half of the detector. With this rotation of the target, the speckle pattern moves from the bottom detector half to the top detector half, without corresponding movement from right to left or left to right detector halves.

For example, as illustrated in FIG. 10B, there is a time delay observed between the time-intensity response of the top detector half and the bottom half. This time delay represents the amount of time between detection of the speckle pattern at the bottom detector and the detection of that same speckle pattern at the top detector half. That is to say, motion of the speckle pattern from the bottom detector half to the top detector half.

With further reference to FIG. 11B, it may be observed that the time-intensity of the left and right detector halves responses are not the same at any time. This observation indicates that the speckle pattern detected at the left detector half is not the same pattern detected at the right detector half at any time. That is to say, the speckle pattern does not move from the left to right detector half or the right to left detector half.

As discussed above, the cross-correlation between top and bottom detector halves is performed to obtain the first time delay characterizing the magnitude and sign of the elevation vector. Similarly, the cross-correlation between the left and right detector halves is performed to obtain the time delay characterizing the magnitude and sign of the azimuth vector. In an embodiment, the analyzer 214' (e.g., cross-correlation component 804) performs the cross-correlation according to Equation 7:

$$\mathrm{CORR}(X, Y) = \frac{\sum_{i=1}^{n}(X_i - \overline{X})(Y_i - \overline{Y})}{\sqrt{\sum_{i=1}^{n}(X_i - \overline{X})^2}\sqrt{\sum_{i=1}^{n}(Y_i - \overline{Y})^2}} \quad (7)$$

where X and Y are the intensity-time responses calculated for corresponding detector halves, i is an index on time ranging from 1 to n, $X_i$ and $Y_i$ are the reflected light intensity sampled at two corresponding detector halves for time index i, and $\bar{X}$ and $\bar{Y}$ are the means of $X_i$ and $Y_i$, respectively.

The cross-correlation of Equation 7 characterizes the degree to which X and Y are alike as a function of the time delay applied between the two responses. This operation can be thought of as holding the intensity-time response of one detector half fixed and shifting the intensity-time response of the corresponding detector half along the time axis. The cross-correlation exhibits a maximum at the time delay for which the intensity-time responses of the two detector halves overlap (i.e., are most alike). The analyzer 214' (e.g., the speckle analysis component 806, may determine the time delay at the peak according to techniques understood in the art for identifying the argument maximizing a function.

The selection of which of the corresponding detector halves is X and which is Y in Equation 7 may be made such that the time delay is negative for speckle motion in the negative direction of the coordinate system assumed for the analysis. Thus, the time delay of the cross-correlation maximum quantifies the magnitude and sign of the vector components of the speckle velocity.

Figure 10C:
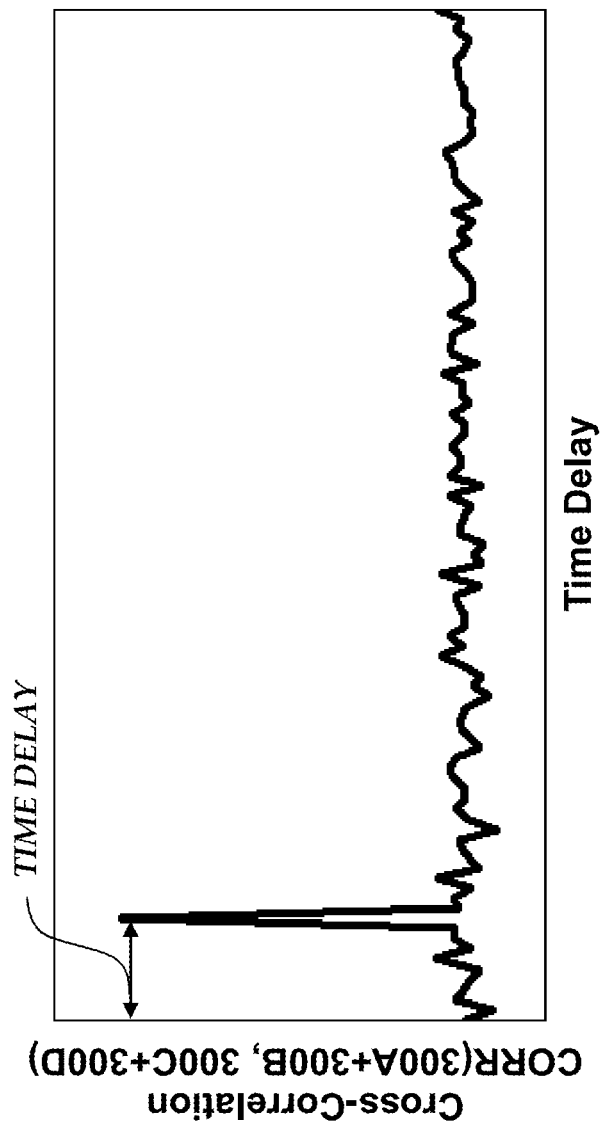
Figure 11C:
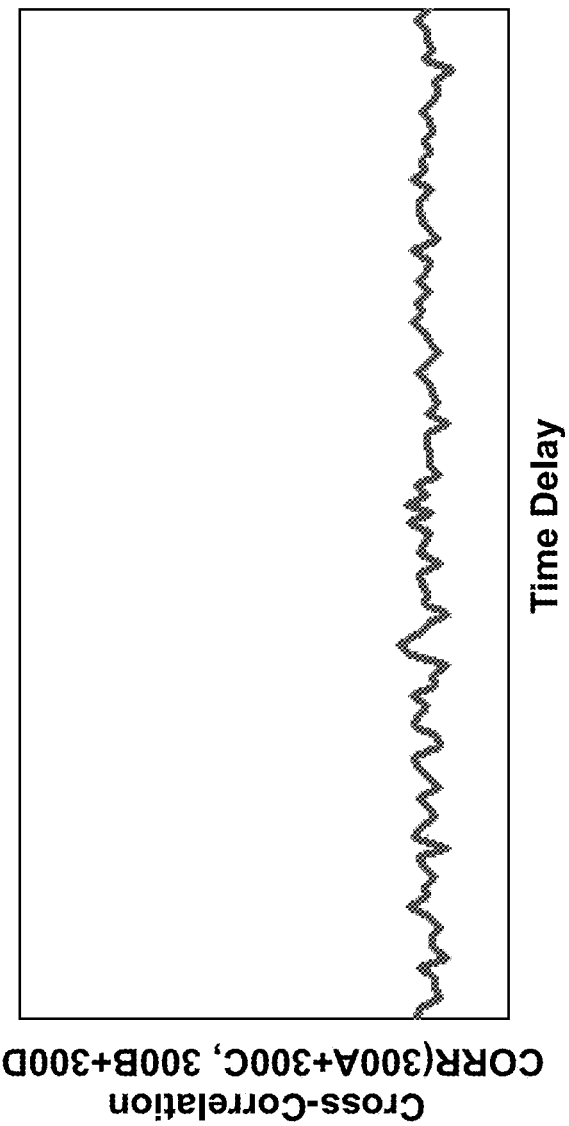

Continuing the example above, FIG. 10C presents the cross-correlation of intensity-time response of the top detector half (300A+300B) and the bottom detector half (300C+300D), notated as CORR(300A+300B, 300C+300D). FIG. 11C illustrates an embodiment of the cross-correlation between the intensity-time response of the left detector half (300A+300C) and the right detector half (300B+300D), notated as CORR(300A+300C, 300B+300D). Each cross-correlation plots a cross-correlation parameter in arbitrary units along the vertical axis and the time delay along the horizontal axis. With reference to FIG. 10C, a peak (i.e., maximum) is observed at the time delay where the time-intensity responses of the top and bottom detector halves are most alike. In contrast, the cross-correlation of FIG. 11C does exhibit a peak at any time delay. These results are consistent with the observations discussed above with respect to FIGS. 10B and 10C.

As discussed above, the linear velocity, V, of the speckle motion is given by the sum of the first and second vectors. The target's angular rotation vector, $\Omega$, is calculated from this linear velocity according to Equation 8:

$$\Omega = V/\text{Range} \quad (8)$$

where Range is the distance between the system 102 and the target 104. In certain embodiments, the analyzer 214' may obtain the range from the data storage device 216 for use in determining the target's angular rotation.

The above-described systems and methods can be implemented in digital electronic circuitry, in computer hardware, firmware, and/or software. The implementation can be as a computer program product. The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Subroutines and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, Hiper-LAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

The transmitting device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a Blackberry®.

The terms comprise, include, and/or plural forms of each are open ended and include the listed parts and can include additional parts that are not listed. The term and/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A method of remotely measuring rotation of a target, comprising:
    transmitting a coherent light beam;
    measuring, at a detector having a field of view divided into at least four spatially distinct light sensing segments, coherent light of the coherent light beam reflected from a target incident upon the detector field of view;
    outputting, by the detector, a plurality of signals to one or more processors, each signal representing a Doppler spread of the reflected light received at a respective detector segment; and
    determining, by the one or more processors:
        a first Doppler spread for reflected light received at a first half of the detector, the first Doppler spread including a first Doppler shift;
        a second Doppler spread for reflected light received at second half of the detector corresponding to the first half, the second Doppler spread including a second Doppler shift, wherein the first and second halves of the detector are separated along a first detector axis of division; and
        a first Doppler shift difference between the first and second Doppler shifts;
    further determining, by the one or more processors:
        a third Doppler spread for reflected light received at a third half of the detector, the third Doppler spread including a third Doppler shift; and
        a fourth Doppler spread for reflected light received at a fourth half of the detector corresponding to the third half, the fourth Doppler spread including a fourth Doppler shift; and
        a second Doppler shift difference between the third and fourth Doppler shifts;
        wherein the third and fourth halves of the detector are separated along a second detector axis of division orthogonal to the first detector axis of division; and
    identifying, by the one or more processors, a rotation axis of the target, the rotation axis aligned with a vector given by the sum of:
        a first vector aligned with the first detector axis of division and having a magnitude given by the first Doppler shift difference; and
        a second vector aligned with the second detector axis of division and having a magnitude given by the second Doppler shift difference; and
    identifying, by the one or more processors, a width, $\Delta f$, of the Doppler spread of the reflected light received over the entire field of view of the detector; and
    calculating the magnitude of the target rotation according to:

$$\Delta f = 2D\Omega/\lambda$$

where D is the diameter of the target, $\Omega$ is the magnitude of the target rotation, and $\lambda$ is the wavelength of the incident light.

2. The method of claim 1, wherein measuring coherent light reflected from the target comprises heterodyne detection of the coherent light reflected from the target incident upon the detector field of view.

3. The method of claim 1, wherein determining the Doppler spread for reflected light received at each of said first, second, third, and fourth detector halves comprises, by the one or more processors, coherently adding the Doppler spreads measured by at least two different detector segments forming said first, second, third, or fourth detector half, respectively.

4. The method of claim 3, wherein:
    the first detector half comprises a first and a second detector segment;
    the second detector half comprises a third and a fourth detector segment;
    the third detector half comprises the first and the third detector segment; and
    the fourth detector halve comprise the second and the fourth detector segments.

5. The method of claim 1, wherein determining the Doppler spread for reflected light received over the entire field of view of the detector comprises, by the one or more processors, coherently adding the Doppler spreads measured for each detector segment.

6. The method of claim 1, wherein identifying $\Delta f$ comprises, by the one or more processors:
    identifying the peak of the Doppler spread in the frequency domain; and
    measuring the full width of the Doppler spread at half the intensity from the peak; and
    identifying $\Delta f$ as said measured full width of the Doppler spread.

7. A detection system for measuring rotation of a target, comprising:
a first light source for transmitting a first coherent light beam having a first frequency;
a detector including a field of view divided into at least four spatially distinct light sensing elements, the detector adapted to:
measure coherent light of the first coherent light beam reflected from a target incident upon the detector field of view; and
output a plurality of signals, each signal representing a Doppler spread of the reflected light received at a respective detector segment;
one or more processors in communication with the detector, the one or more processors adapted to:
receive the plurality of signals;
determine a first Doppler spread for reflected light received at a first half of the detector, the first Doppler spread including a first Doppler shift;
determine a second Doppler spread for reflected light received at second half of the detector corresponding to the first half, the second Doppler spread including a second Doppler shift, wherein the first and second halves of the detector are divided by a first detector axis of division;
determine a first Doppler shift difference between the first and second Doppler shifts; determine a third Doppler spread for reflected light received at a third half of the detector, the third Doppler spread including a third Doppler shift; and
determine a fourth Doppler spread for reflected light received at a fourth half of the detector corresponding to the third half, the fourth Doppler spread including a fourth Doppler shift, wherein the third and fourth halves of the detector are separated along a second detector axis of division orthogonal to the first detector axis of division;
determine a second Doppler shift difference between the third and fourth Doppler shifts;
identify a rotation axis of the target aligned with a vector given by the sum of:
a first vector aligned with the first detector axis of division and having a magnitude given by the first Doppler shift difference; and
a second vector aligned with the second detector axis of division and having a magnitude given by the second Doppler shift difference; and
identify a width, $\Delta f$, of the Doppler spread of the reflected light received over the entire field of view of the detector; and
calculate the magnitude of the target rotation according to:

$$\Delta f = 2D\Omega/\lambda$$

where D is the diameter of the target, $\Omega$ is the magnitude of the target rotation, and $\lambda$ is the wavelength of the incident light.

8. The detection system of claim 7, further comprising:
a plurality of optical focusing systems adapted to direct the first coherent light beam incident upon the target, and direct least a portion of the coherent light reflected from the target at reflected coherent light upon the detector field of view; and
a second light source adapted to emit a second coherent light beam having a second frequency upon the detector field of view, the second frequency different than the first frequency;
wherein the plurality of signals output by the detector are based upon interference of the reflected first coherent light beam and the second coherent light beam.

9. The detection system of claim 7, wherein the one or more processors are further adapted to coherently add the Doppler spreads measured by at least two different detector segments forming each of said first, second, third, or fourth detector half to determine the Doppler spread for reflected light received at each of said first, second, third, and fourth detector halves, respectively.

10. The detection system of claim 9, wherein the detector comprises four spatially distinct light sensing segments arranged in quadrants, wherein the first half of the detector comprises the first and second detector segments, wherein the second half of the detector comprises the third and fourth detector segments, wherein the third half of the detector comprises the first and third detector segments, and wherein the fourth half of the detector comprises the second and fourth detector segments.

11. The detection system of claim 7, wherein the one or more processors are further adapted to determine the Doppler spread for reflected light received over the entire field of view of the detector comprises by coherently adding the Doppler spreads measured for each detector segment.

12. The detection system of claim 7, wherein the one or more processors are further adapted to:
identify the peak of the Doppler spread in the frequency domain;
measure the full width of the Doppler spread at half the intensity from the peak; and
identify $\Delta f$ as said measured full width of the Doppler spread.

13. A non-transitory computer-readable medium having computer-readable program codes embedded thereon including instructions that, when executed by the one or more processors, cause the one or more processors to:
receive a plurality of signals output from respective segments of a detector including at least four spatially distinct light sensing segments, each signal representing a Doppler spread of coherent light reflected from a target and received at the respective detector segment, the coherent light being transmitted from a light source;
determine a first Doppler spread for reflected light received at a first half of the detector, the first Doppler spread including a first Doppler shift;
determine a second Doppler spread for reflected light received at second half of the detector corresponding to the first half, the second Doppler spread including a second Doppler shift, wherein the first and second detectors are divided by a first detector axis of division;
determine a first Doppler shift difference between the first and second Doppler shifts;
determine a third Doppler spread for reflected light received at a third half of the detector, the third Doppler spread including a third Doppler shift; and
determine a fourth Doppler spread for reflected light received at a fourth half of the detector corresponding to the third half, the fourth Doppler spread including a fourth Doppler shift, wherein the third and fourth halves of the detector are separated along a second detector axis of division orthogonal to the first detector axis of division;
determine a second Doppler shift difference between the third and fourth Doppler shifts;
identify a rotation axis of the target aligned with a vector given by the sum of:

a first vector aligned with the first detector axis of division and having a magnitude given by the first Doppler shift difference; and a second vector aligned with the second detector axis of division and having a magnitude given by the second Doppler shift difference; and identify a width, $\Delta f$, of the Doppler spread of the reflected light received over the entire field of view of the detector; and calculate the magnitude of the target rotation according to:

$$\Delta f = 2D\Omega/\lambda$$

where D is the diameter of the target, $\Omega$ is the magnitude of the target rotation, and $\lambda$ is the wavelength of the reflected light.

14. The computer-readable medium of claim 13, further including instructions that, when executed, cause the one or more processors to coherently add the Doppler spreads measured by at least two different detector segments forming each of said first, second, third, or fourth detector half to determine the Doppler spread for reflected light received at each of said first, second, third, and fourth detector halves, respectively.

15. The computer-readable medium of claim 13, further including instructions that, when executed, cause the one or more processors to:

coherently sum of the Doppler spreads measured for each detector segment as the Doppler spread of the reflected light received over the entire field of view of the detector;

identify the peak of the Doppler spread in the frequency domain; and identify the width of the Doppler spread to be the full width of the Doppler spread at half the intensity from the peak.

* * * * *